US005774319A

United States Patent [19]
Carter et al.

[11] Patent Number: 5,774,319
[45] Date of Patent: Jun. 30, 1998

[54] ENERGY VALIDATION ARRANGEMENT FOR A SELF-POWERED CIRCUIT INTERRUPTER

[75] Inventors: Michael Baron Carter, Clayton; Roger Alan Plemmons, Raleigh; Barry Noel Rodgers, Raleigh; Timothy Brian Phillips, Raleigh; George Marshall Horne, Cary, all of N.C.

[73] Assignee: Square D Company, Palatine, Ill.

[21] Appl. No.: 558,310

[22] Filed: Nov. 15, 1995

Related U.S. Application Data

[63] Continuation-in-part of Ser. No. 147,280, Oct. 27, 1993, abandoned.

[51] Int. Cl.$^6$ ............................................. H02H 3/00
[52] U.S. Cl. .............................................. 361/93; 361/100
[58] Field of Search ................................. 361/93, 94, 98, 361/100

[56] References Cited

U.S. PATENT DOCUMENTS

| | | | |
|---|---|---|---|
| 3,813,507 | 5/1974 | Kesselring | 200/148 A |
| 4,048,663 | 9/1977 | Lemke | 361/75 |
| 4,597,025 | 6/1986 | Rutchik et al. | 361/94 |
| 4,731,692 | 3/1988 | Dvorak et al. | 361/102 |
| 4,823,226 | 4/1989 | Reed et al. | 361/85 |
| 4,879,626 | 11/1989 | Kim et al. | 361/93 |
| 4,897,756 | 1/1990 | Zylstra | 361/44 |
| 4,992,723 | 2/1991 | Zylstra et al. | 323/284 |
| 5,016,135 | 5/1991 | Zylstra | 361/156 |
| 5,038,246 | 8/1991 | Durivage | 361/93 |
| 5,179,495 | 1/1993 | Zuzuly | 361/94 |

FOREIGN PATENT DOCUMENTS

| | | |
|---|---|---|
| 0469207A2 | 2/1992 | European Pat. Off. . |
| 0477959A2 | 4/1992 | European Pat. Off. . |

*Primary Examiner*—Jeffrey A. Gaffin
*Assistant Examiner*—Sally C. Medley
*Attorney, Agent, or Firm*—Larry I. Golden; David R. Stacey; Larry T. Shrout

[57] ABSTRACT

A self-powered circuit interrupter arrangement for interrupting current in a circuit path uses a current-blocking component to ensure that an insufficient amount of accumulated power for actuating and completing interruption of the circuit path is not misused in an unwarranted attempt to interrupt the current path. The arrangement includes a current inducer circuit for providing a current signal having a magnitude corresponding to the current in the circuit path and a power supply operating from the current signal to provide a voltage signal of a predetermined value relative to common. A trip command circuit, in response to a fault detected in the circuit path, sends an electrical signal commanding that the circuit path be interrupted by using the voltage signal. The electrical signal is sent to an electrical latch located electrically in series with a coil of a solenoid mechanism. Current from the power supply passing through the coil of a solenoid mechanism causes the interruption of current in the current path. A prevention circuit is constructed and arranged to prevent the electrical signal from engaging the latch, or current from the power supply from passing through the coil until the voltage signal exceeds the predetermined value.

54 Claims, 14 Drawing Sheets

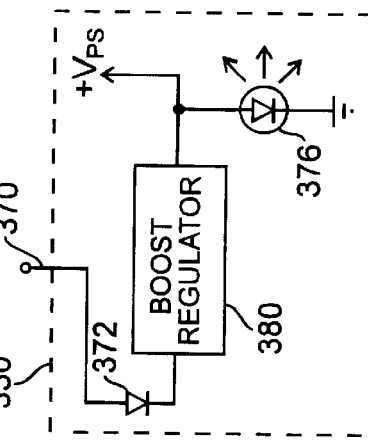
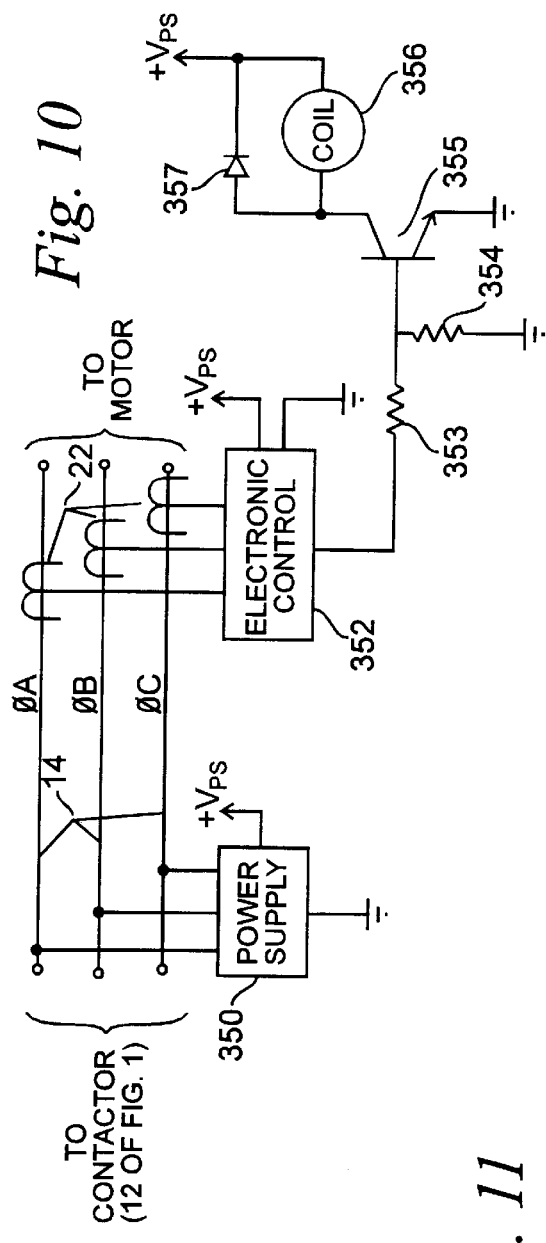
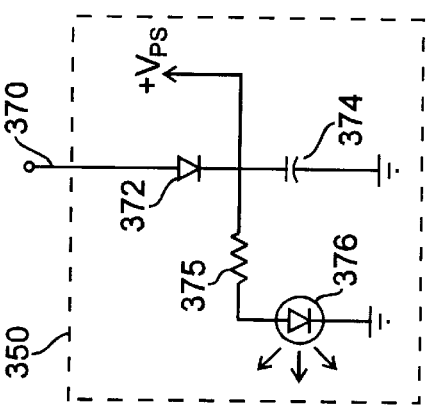
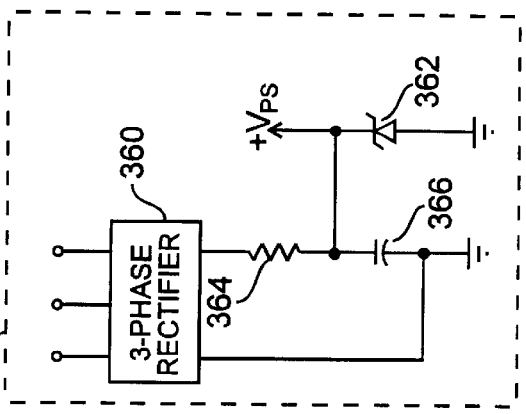

5,774,319

ENERGY VALIDATION ARRANGEMENT FOR A SELF-POWERED CIRCUIT INTERRUPTER

This application is a continuation in-part of Application No. 08/147,280 filed Oct. 27, 1993 now abandoned.

FIELD OF THE INVENTION

The present invention relates to circuit interruption arrangements, and more particularly, to tripping arrangements, such as circuit breakers and overload relays, which are powered from the circuit path they are arranged to interrupt (self-powered).

BACKGROUND OF THE INVENTION

The use of circuit breakers is widespread in modern-day residential, commercial and industrial electrical systems, and they constitute an indispensable component of such systems toward providing protection against over-current conditions. Various circuit breaker mechanisms have evolved and have been perfected over time on the basis of application-specific factors such as current capacity, response time, and the type of reset (manual or remote) function desired of the breaker.

One type of circuit breaker mechanism employs a thermomagnetic tripping device to "trip" a latch in response to a specific range of over-current conditions. The tripping action is caused by a significant deflection in a bi-metal or thermostat-metal element which responds to changes in temperature due to resistance heating caused by flow of the circuit's electrical current through the element. The thermostat metal element is typically in the form of a blade and operates in conjunction with a latch so that the blade deflection releases the latch after a time delay corresponding to a predetermined over-current threshold in order to "break" the current in the circuit associated therewith.

Another type of circuit interruption arrangement, useful for interrupting circuits having higher current-carrying capacities, uses current transformers to induce a current corresponding to the current in the circuit path, and an electronic circuit monitoring the induced current to detect power faults in the circuit path. In response to a power fault being detected, the electronic circuit generates a control signal to actuate a solenoid (or equivalent device) to cause the circuit-interrupting contacts to separate and interrupt the circuit path.

Causing the circuit-interrupting contact to separate, however, can be a problem. For instance, it requires a significant accumulation of energy which is typically scarce in such arrangements which are self-powered, and an unsuccessful attempt to interrupt the circuit path depletes the reservoir of accumulated energy. This problem has been addressed to some extent by using an undervoltage lockout circuit which ensures that a trip is not initiated until the power supply has sufficient energy to complete the trip. However, this requires a circuit to monitor the voltage on the power supply.

In addition, if a trip command is initiated at turn-on the trip cannot be completed because the power source cannot instantaneously deliver sufficient power to complete the trip. Moreover, the unsuccessful attempt to trip will discharge that energy which has been stored in the power supply capacitor such that it cannot fully recharge before the next trip attempt, thereby causing the succeeding trip attempts to also fail.

Accordingly, there is a need for a circuit interruption arrangement which overcomes the aforementioned shortcomings of prior art devices.

SUMMARY OF THE INVENTION

The present invention provides a self-powered circuit interrupter arrangement for interrupting current in a path without the need to monitor the voltage developed at the power supply. In one implementation of the present invention, a self-powered circuit interrupter arrangement for interrupting current in a circuit path uses a current-blocking component to ensure that an insufficient amount of accumulated power for actuating interruption of the circuit path is not misused in an unwarranted attempt to interrupt the current path.

In a specific implementation of the present invention, a circuit interruption arrangement includes a current inducer circuit for providing a current signal having a magnitude corresponding to the current in the circuit path; a power supply operating from the current signal provided by the current inducer and providing a voltage signal relative to common; a solenoid mechanism having a coil through which current from the power supply passes to cause interruption of the current in the circuit path; a trip command circuit, responsive to a fault in the circuit path, including an overload detector, for sending an electrical signal commanding that the circuit path be interrupted; and an electrical latch actuated in response to both the electrical signal from the trip command circuit and the voltage signal exceeding a predetermined value equivalent to the energy required to complete the trip. The electrical latch is arranged in series with the coil between the power supply and common and it includes a first terminal coupled to the trip circuit and a second terminal coupled to the power supply. A prevention circuit is constructed and arranged to prevent one of the electrical signals from the trip command circuit and the voltage signal from engaging the electrical latch when the voltage signal is less than the predetermined value.

The above summary of the present invention is not intended to represent each embodiment, or every aspect of the present invention. Other features and advantages of the invention will become apparent to those skilled in the art upon review of the following detailed description and drawings.

BRIEF DESCRIPTION OF THE DRAWINGS

FIG. 5 is a schematic of an second implementation of the circuit of FIG. 4a.

FIG. 6 is a schematic of a third implementation of the circuit of FIG. 4a.

FIG. 7 is a schematic of a fourth implementation of the circuit of FIG. 4a.

FIG. 8 is a schematic of a fifth implementation of the circuit of FIG. 4a.

FIG. 10 is a schematic of an alternate implementation of the circuit of FIG. 4a.

FIGS. 11–13 are schematics illustrating various implementations of the power supply shown in FIG. 10.

Figure 1:
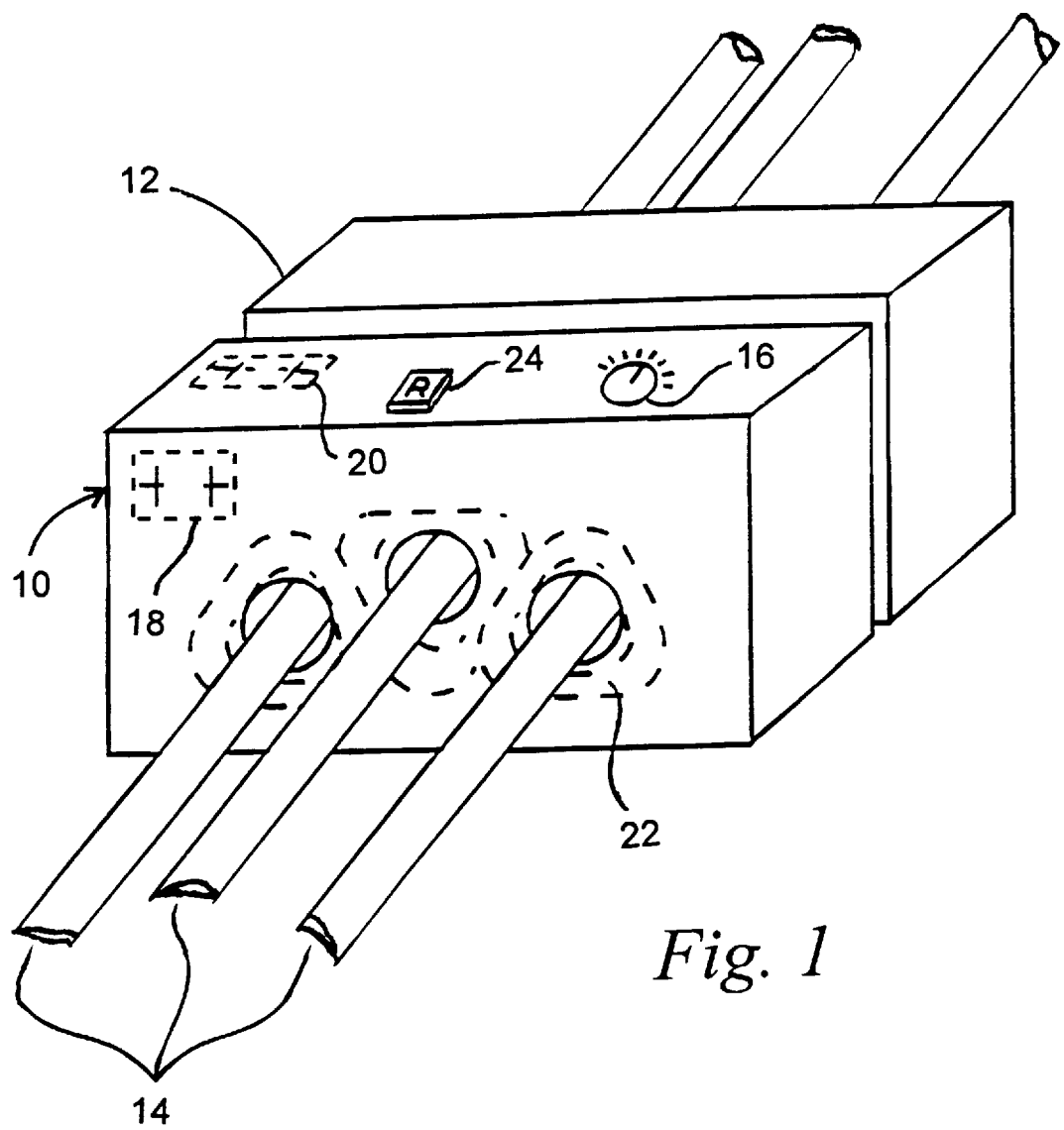
FIG. 1 is a perspective illustration of a circuit interruption system, in accordance with the present invention.

Before the embodiments of the invention are explained in detail, it is to be understood that the invention is not limited in its application to the details of construction in the description or illustrated in the drawings. The invention is capable of other embodiments and of being practiced or being carried out in various other ways. Also, it is to be understood that the phraseology and terminology used herein is for the purpose of description and should not be regarded as limiting.

DESCRIPTION OF THE PREFERRED EMBODIMENT

The present invention may be used in a wide variety of residential, commercial and industrial applications. For the sake of brevity, however, the implementation of the present invention to be described and illustrated below is directed to high-performance applications requiring low cost and a small package. Turning now to FIG. 1, a perspective illustration of a circuit interruption system as shown in the form of an overload relay 10 and a contactor unit 12. The overload relay 10 has s set of three phase conductors 14 passing through apertures in its housing. The contactor unit 12 is conventional, for example a Square D Class 8502, Type SA012, and can be implemented to interrupt the three-phase conductors 14.

The overload relay 10 includes three individual current transformers or a three phase current transformer 22 (shown in dotted lines) within the housing of the overload relay, and a manual reset button 24 for resetting the electronics and solenoid control and latch mechanism which commands the contactor unit 12 to interrupt the circuit path provide by the three phase conductors 14. Overload contacts 18 and auxiliary contacts 20 are provided for actuating the contactor unit 12 to interrupt the current path in the conductors 14 and for providing an auxiliary alarm signal to indicate that the unit has tripped, respectively. A potentiometer dial 16 is included on the overload relay 10 housing to provide the user with the ability to change the set point for the current trip level within a predetermined range.

Figure 2:
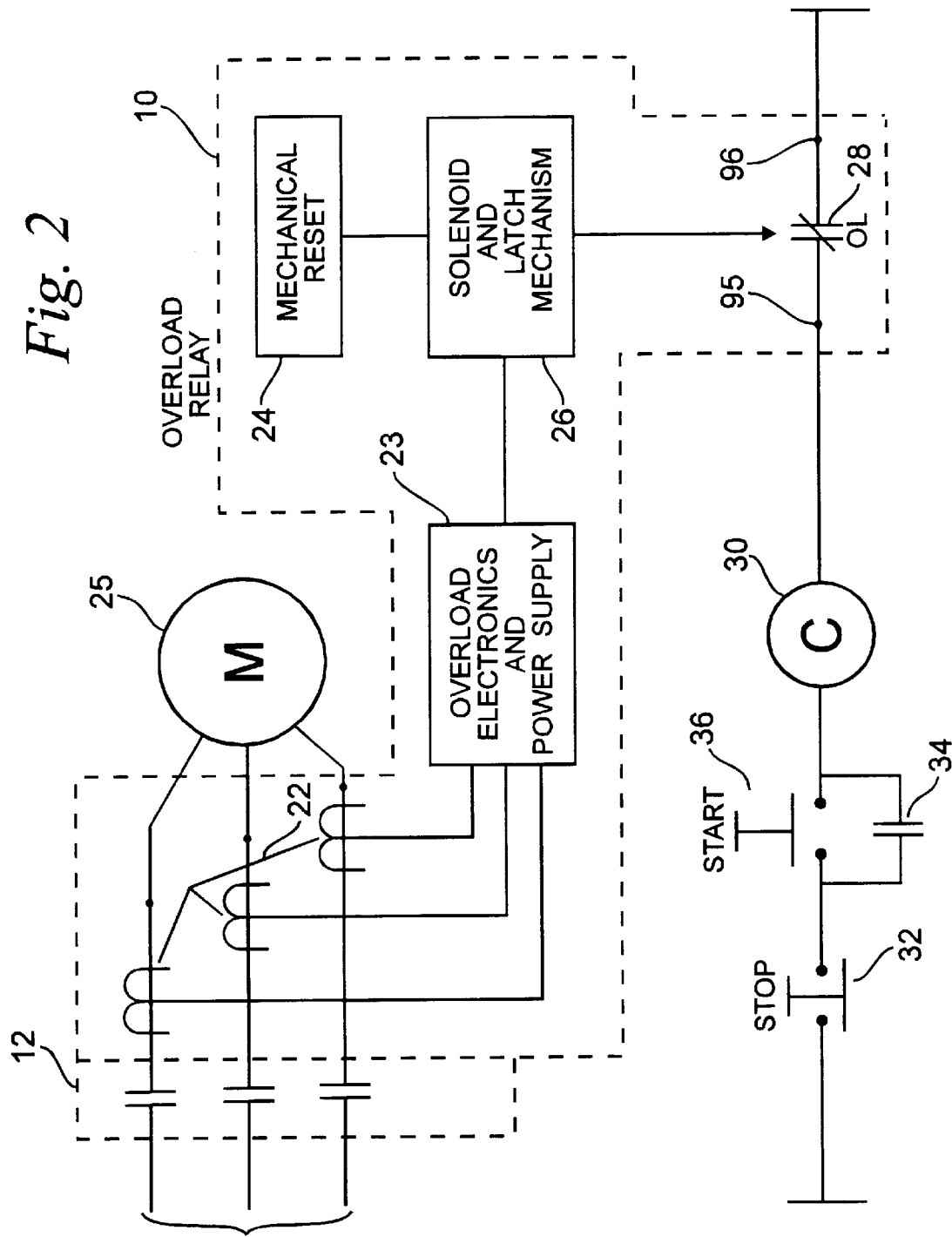
FIG. 2 is an electrical block diagram of the system of FIG. 1.

In FIG. 2, the overload relay 10 and the contactor unit 12 are shown from an electrical perspective providing current to a three-phase motor 25 and having three high-level functional blocks, an overload electronics/power supply 23, a mechanical reset 24, and a solenoid and latch mechanism 26. The overload electronics/power supply 23 analyzes the current passing to the motor 25 and engages the solenoid and latch mechanism 26 so that the overload contacts 28 (at terminals 95 and 96) can open to de-energize the coil 30 of the contactor 12 if a fault is present. The mechanical reset 24 is arranged to manually reset the solenoid and latch mechanism 26 after a trip has occurred. The stop switch 32 and the holding contacts 34 in parallel with the automatic start switch 36 are conventionally implemented and arranged to provide control of the contactor coil 30 which controls power flow to the motor 25. In this example, tripping and latching consist of a mechanically-held solenoid and latch mechanism 26, powered by the power supply 38 and driven form the overload detection circuitry which is shown in block 23. When the overload detection circuitry detects the overload condition, the coil of the solenoid is energized and this causes mechanical motion to overcome the latch. This opens the normally-closed contacts 28 in series with the contactor coil 30. The contactor then drops out, the seal around the start button 36 is opened, and power is removed from the overload relay's power supply 23. The overload contacts remain in the open position via the latch mechanism 26, until the unit is reset by the mechanical reset 24.

Figure 3A:
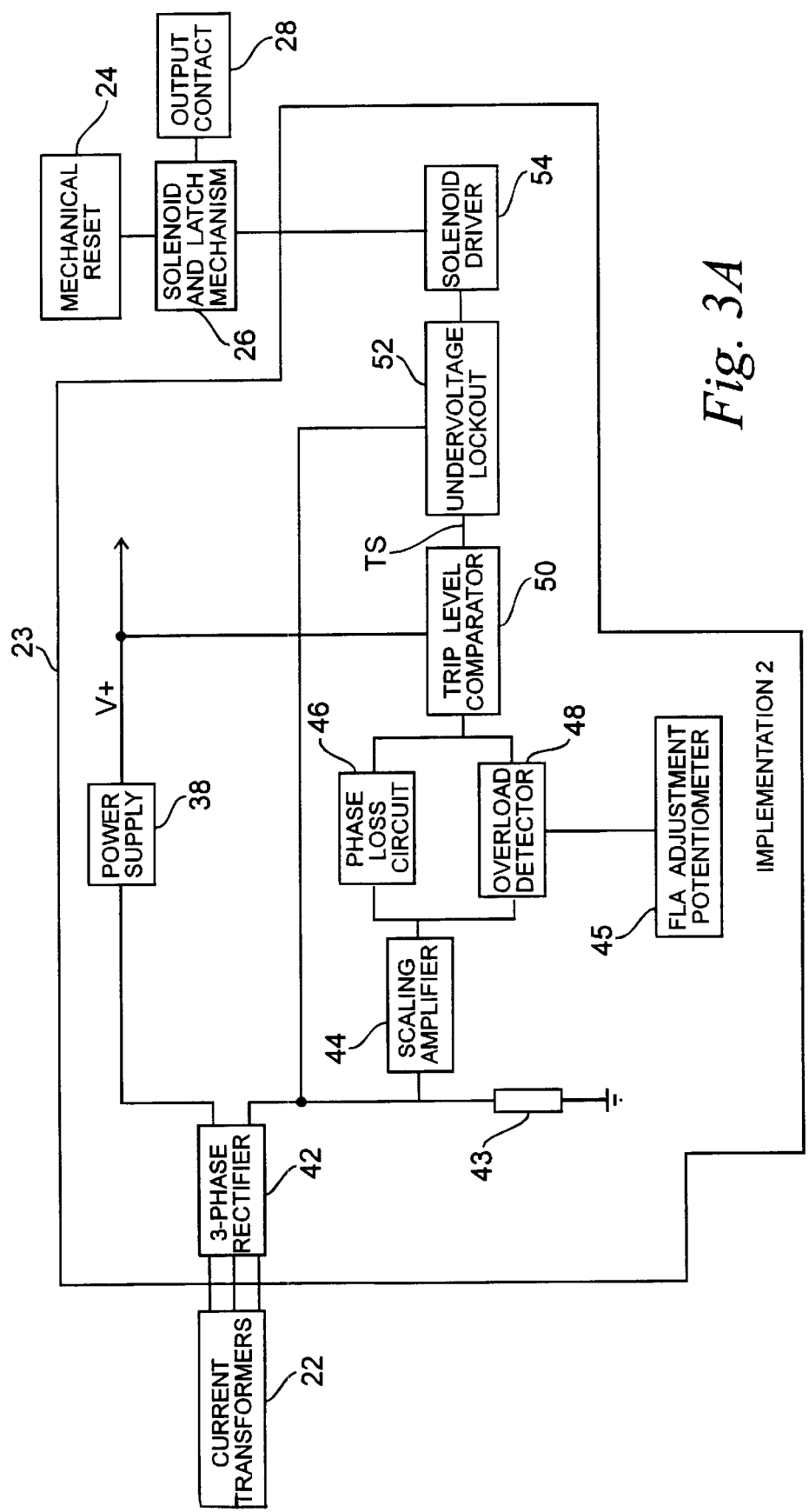
FIG. 3a is a block diagram of a self-powered overload relay which is part of the circuit interruption system of FIG. 1 and embodying the principals of the present invention.
Figure 3B:
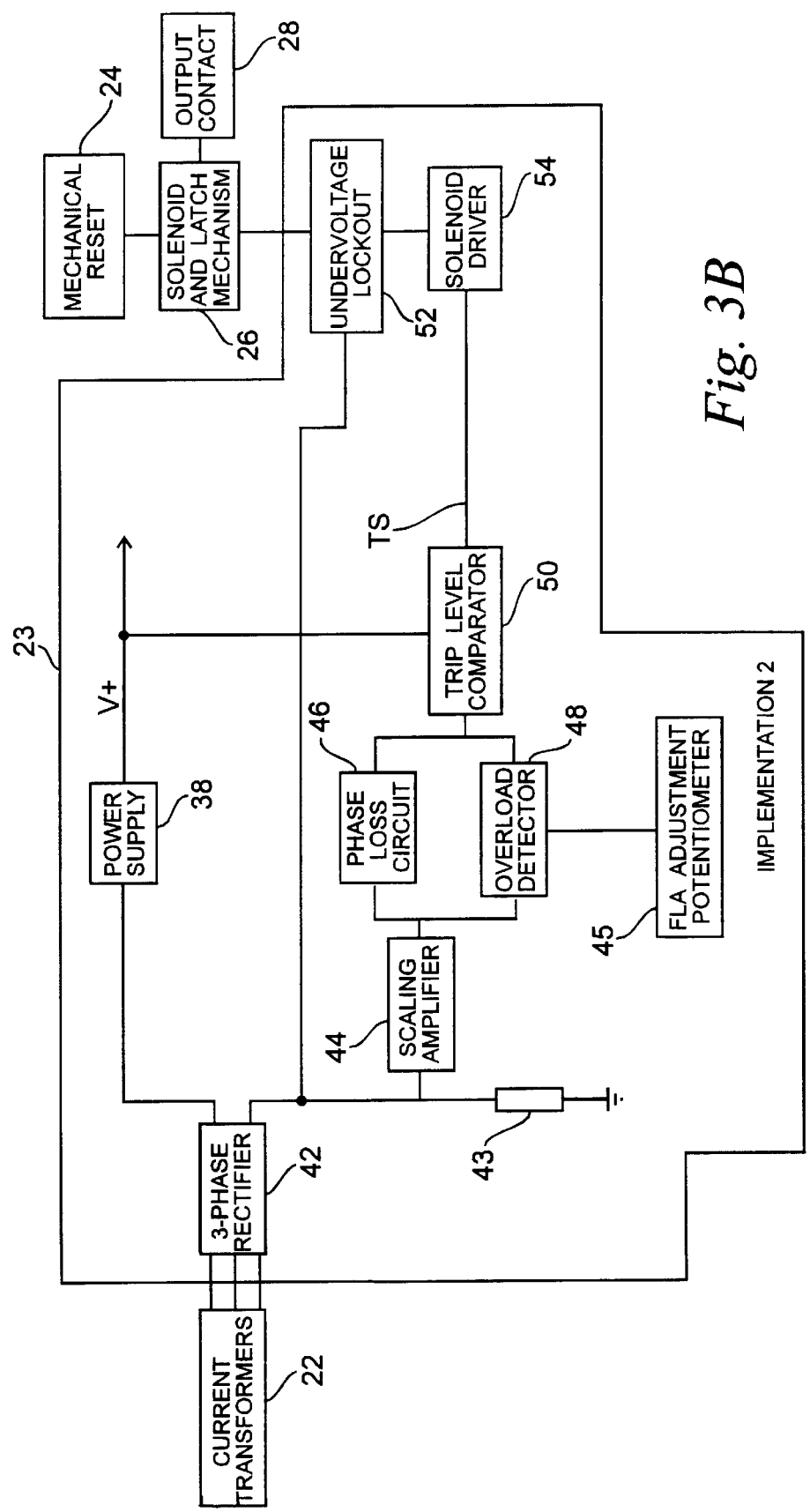
FIG. 3b is a block diagram of a self-powered overload relay which is part of the circuit interruption system of FIG. 1 and embodying the principals of the present invention.

Referring now to FIGS. 3a and 3b, the overload electronics/power supply 23 of FIG. 2 is shown in more detail. A current signal having a magnitude proportional to the current from the three-phase lines 14 is induced by current transformers 22 and the current signal is then rectified by a three-phase rectifier 42. The positive outputs of the three-phase rectifier 42 are summed, via interconnection, to provide a current signal having a magnitude corresponding to the magnitude of the current in the circuit path and the current signal is used to accumulate a voltage on a power supply capacitor 58 in the power supply 38.

The negative outputs of the three-phase rectifier 42 are summed, via interconnection, and converted to a corresponding voltage using a burden resistor 43 between the interconnection point and common (or ground). This corresponding voltage is scaled by a scaling amplifier 44 and, via the dial 16 (of FIG. 1), the set point for the current trip level is adjusted using an FLA (Full Load Amperage) adjustment potentiometer 45.

From the scaling amplifier 44, faults in the three-phase circuit path are detected using a phase loss circuit 46 and an overload detector 48. The phase loss detector 46 protects the motor from overheating when current in one of the three phases is lost (i.e., interrupted or grossly unbalanced with respect to the other two phases). A contactor control circuit including the overload detector 48 functions as an overload timer monitoring a three-phase current condition in which the motor 25 is drawing an excessive amount of current for a predetermined period of time. The phase loss and overload conditions can occur separately or in conjunction with one another. A motor does not necessarily have to be drawing more than the normal current in order to overheat in a phase loss condition because the device only measures the current in the stator. In a phase loss condition, the current in the stator may not necessarily go above an overload condition but currents in the rotor that are difficult to measure will exceed the overload condition thereby causing the motor to overheat.

With reference to a stable reference voltage set relative to the power supply common for the overload relay 10, a trip level comparator 50 monitors the outputs of the phase loss circuit 46 and overload detector 48. When the trip level comparator 50 determines that a phase loss or an overload has been detected, the trip level comparator 50 generates a trip signal TS using the V+ of the power supply 23. The trip signal TS is directed to the solenoid driver 54 which activates the solenoid and latch mechanism 26, causing the contactor unit 12 to break the circuit path in 5 the conductors 14 carrying current to the motor 25.

For further details of the three-phase rectifier 42, scaling amplifier 44, phase-loss circuit 46, overload detector 48, and trip level comparator 50, reference may be made to U.S. patent application No. 08/143,948, entitled "Self-Powered Circuit Arrangement" (RLC-10/SQUC-120), filed on Oct. 27, 1993, assigned to the instant assignee and incorporate herein by reference.

By way of an undervoltage lockout circuit 52, two implementations of undervoltage protection are illustrated in FIGS. 3a and 3b. The implementation of FIG. 3a employs the undervoltage lockout circuit 52 between the trip-level comparator 50 and the solenoid driver 54, so that a trip signal TS sent from the trip level comparator 50 can be blocked by the undervoltage lock out circuit 52 when the power supply capacitor 58 has not stored a predetermined value of energy sufficient to complete the trip. The implementation of FIG. 3b employs the undervoltage lockout circuit 52 between the solenoid driver 54 and the solenoid and latch mechanism 26, blocking current flow through the solenoid and latch mechanism 26 until the power supply capacitor 58 has stored the predetermined value of energy sufficient to complete the trip, even though the trip signal TS may have already triggered the solenoid driver 54. In either case, the undervoltage lockout circuit 52 ensures that there is sufficient energy stored in the power supply capacitor 58 to engage the solenoid and complete the trip. This is accomplished without having a power supply monitoring circuit for determining if there is sufficient voltage present to complete the trip.

Figure 4A:
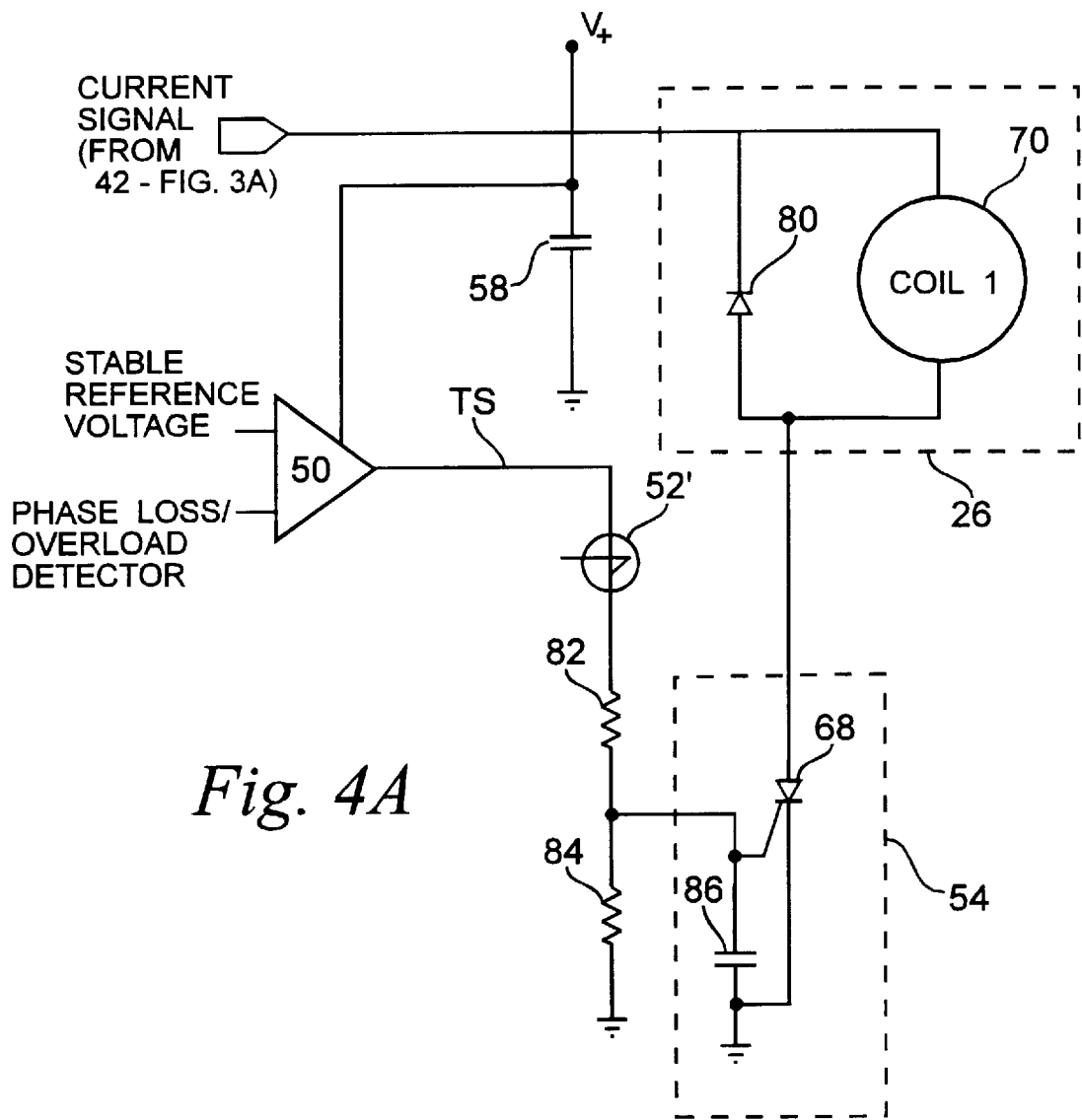
FIG. 4a is a schematic of portions of the overload relay of FIG. 3a relating specifically to the circuit which prevents a trip attempt when insufficient energy is available at the power supply capacitor.
Figure 4B:
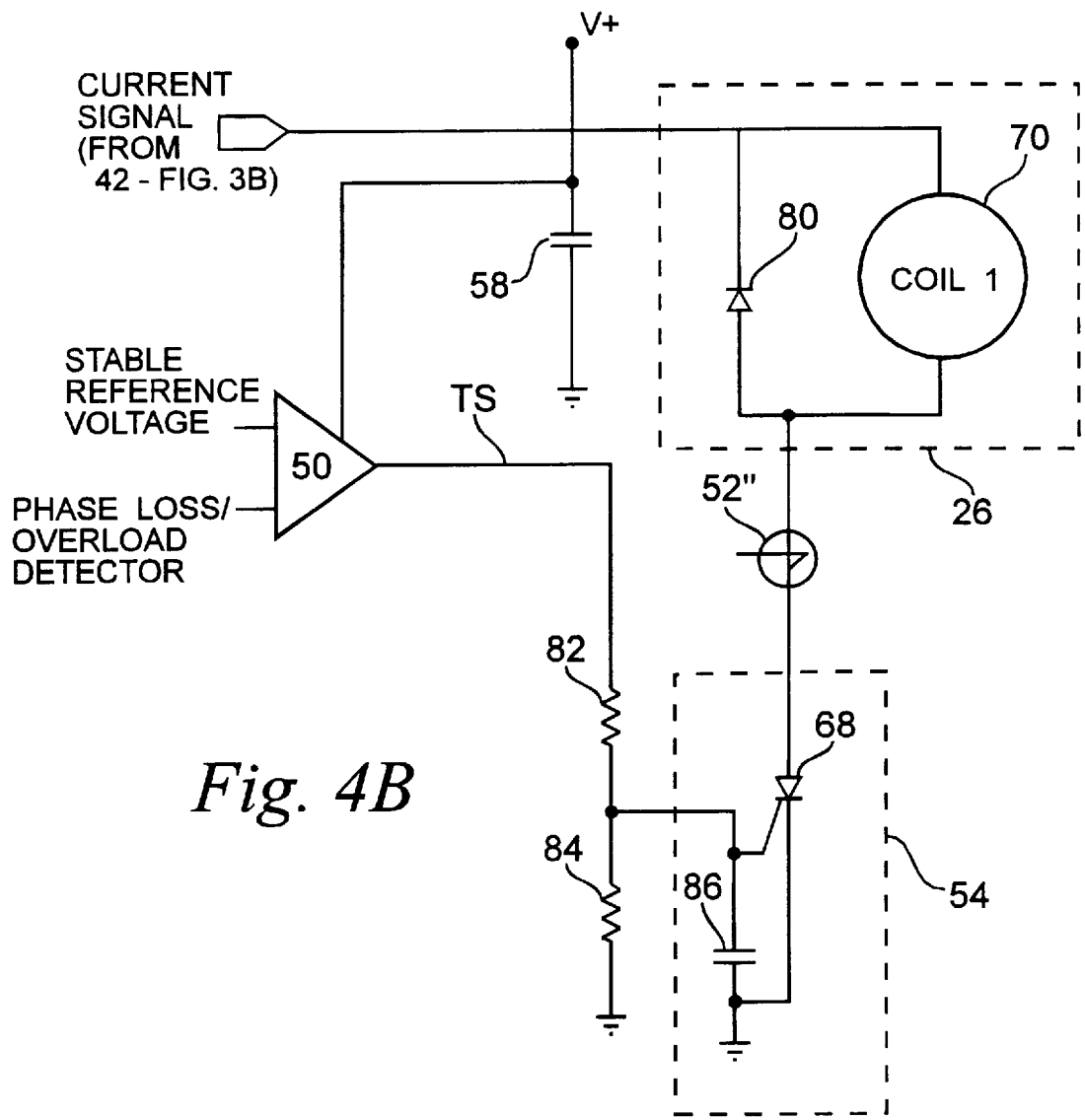
FIG. 4b is a schematic of portions of the overload relay of FIG. 3b relating specifically to the circuit which prevents a trip attempt when insufficient energy is available at the power supply capacitor.
Figure 5:
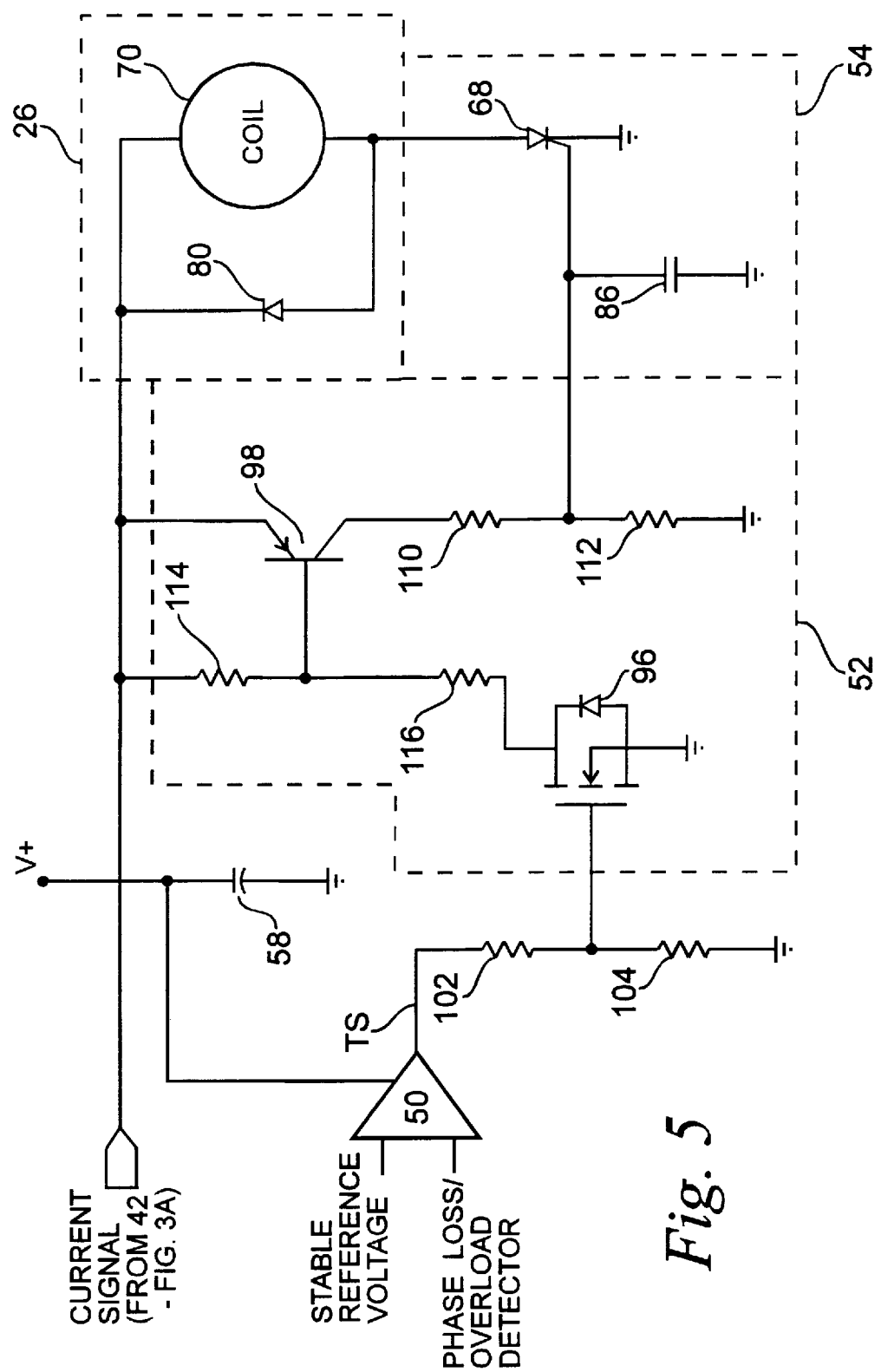

FIGS. 4a, 4b and 5 illustrate various implementation of the undervoltage lockout circuit 52 corresponding to the implementations of FIGS. 3a and 3b. In FIGS. 4a, 4b and 5, the current signal from the three-phase rectifier 42 is shown providing current to charge the power supply capacitor 58, which is depicted in FIGS. 4a and 4b as a 220 (or 470) microfarad capacitor. The power supply capacitor 58 stores the necessary tripping energy and provides an operational power supply to the overload relay 10. The trip signal TS is provided at the output of the trip level comparator 50.

Referring to FIG. 4a, an implementation of the circuit of FIG. 3a is shown. In this implementation, a silicon unilateral switch (SUS) 52' is used to implement the undervoltage lockout circuit 52 and is located between the trip level comparator 50 and the gate of the SCR 68. The SCR 68 is used to drive the solenoid coil 70 in response to a trip signal TS from the trip level comparator 50. The SUS 52' is a breakover device and will not conduct until the device has the breakover voltage across it. Once the SUS conducts, it has very little voltage across it (acting like a switch). Since the SUS is programmable, the device can be adjusted to any of a variety of threshold levels, such as the V+ voltage of the power supply 23 which in this example is about 8 volts. By having the SUS 52' in the circuit, actuation of the solenoid and latch mechanism 26 is not allowed until the power supply capacitor 58 has sufficient charge to complete the trip.

When the trip level comparator 50 generates the trip signal TS, the SUS 52' will not conduct until the voltage level of the trip signal TS exceeds the breakover voltage of the SUS 52' which is selected to be equal to V+. When the breakover level is attained, the SCR 68 is biased ON, thereby causing current to flow through the solenoid 70 and causing the current in the three-phase circuit path to be interrupted. A diode 80 is arranged as a flyback diode for the coil 70 in order to provide a path for the coil current to continue to flow when the SCR 68 turns OFF and to avoid the high inductive kickback voltage which would otherwise occur. A pair of resistors 82 and 84, along with a capacitor 86, provide proper biasing for the SCR 68.

Referring to FIG. 4b, an implementation of the circuit of FIG. 3b is shown. In this implementation, a silicon unilateral switch (SUS) 52" is used to implement the undervoltage lockout circuit 52 and is located in series with the current discharge point of power supply capacitor 58, the coil 70 and the input terminal of the SCR 68. The SUS 52", again having a threshold level equal to V+ of the power supply 23, will not conduct until the voltage of the power supply capacitor 58 is sufficient to complete the trip. When the trip signal TS from the trip level comparator 50 is present, the signal at the gate of the SCR 68 will force the SCR 68 ON. However, the SCR 68 will not conduct until the SUS 52" breakover voltage is reached.

In an exemplary embodiment, the following component values are used for the circuits of FIGS. 4a and 4b:

| resistor 82: | 682 kΩ | capacitor 58: | 470 μF |
|---|---|---|---|
| resistor 84: | 1 kΩ | capacitor 86: | 0.47 μF | and the SUS may be implemented by using a 2N4989 type component available from Motorola or Harris.

Referring to FIG. 5, a second implementation of the circuit of FIG. 3a is shown. In this implementation the silicon unilateral switch (SUS) 52' is replaced by two voltage dividers, an enhancement mode FET (field effect transistor) 96 and a bipolar transistor 98. The trip signal TS (V+) from the trip level comparator 50 is provided to the potential divider including resistors 102 and 104 in an attempt to turn on the FET 96. The FET 96 will not conduct until the gate voltage from the potential divider is sufficient to turn it ON. With no drain current flowing in the FET 96 the transistor 98 will not be turned ON, thereby preventing collector current from flowing out of transistor 98. With no collector current flowing in transistor 98 the SCR 68 can not be turned ON which prevents the coil 70 from being activated. The values of resistors 102 and 104 of the potential divider are selected such that the proper gate voltage for turning ON the FET 96 will be provided when the power supply capacitor 58 has sufficient voltage to complete the trip. When sufficient voltage is present at the gate of FET 96, the FET 96 will conduct and cause the transistor 98 to turn ON and provide an actuation signal to the potential divider including resistors 110 and 112 so as to actuate the SCR 68 for pulling current through the coil 70. A pair of resistors 114 and 116 are used to properly bias the base of transistor 98 in response to actuation of the FET 96.

In an exemplary embodiment, the following component values are used for the components unique to the circuit of FIG. 5:

| resistor 102 | 93.1 kΩ |
|---|---|
| resistor 104 | 10 kΩ |
| resistor 112 | 1 kΩ |
| resistor 114: | 10 kΩ |
| resistor 116: | 98.7 kΩ |
| capacitor 58: | 470 μF | and the FET 96 may be implemented using a 2N7000 type component available from Motorola.

Figure 6:
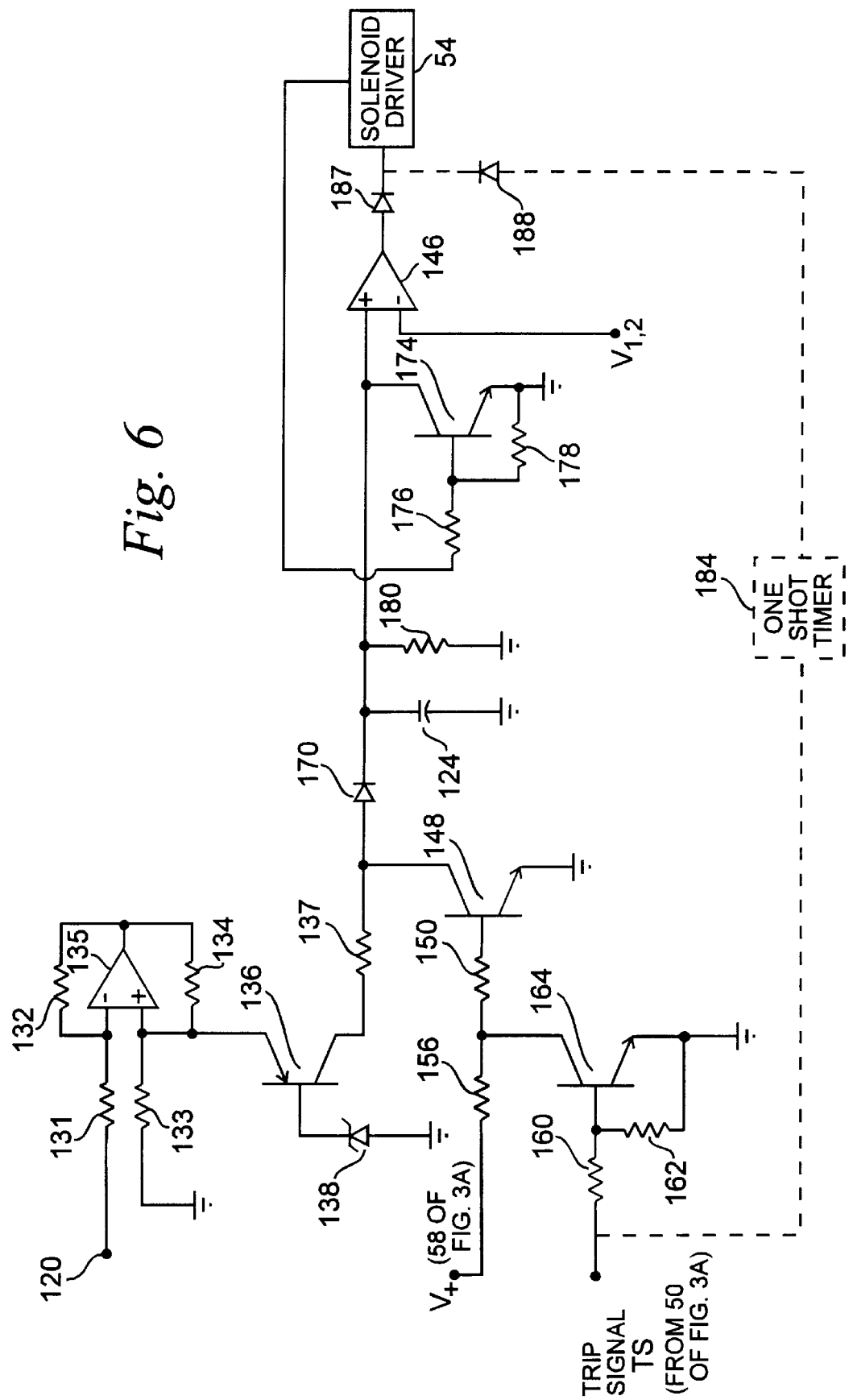

Referring now to FIG. 6, a third implementation of the undervoltage lockout circuit 52 of FIG. 3a is depicted. This implementation further includes a lead 120 from burden resistor 43 fed from the interconnection of the negative outputs of the three-phase rectifier 42 (of FIG. 3a) to an input of the lockout circuit 52. Rather than using an SUS or a FET to prevent the solenoid coil 70 from being activated as discussed in connection with FIGS. 4a, 4b and 5, the implementation of FIG. 6 relies on the magnitude of the current in the three-phase conductors to determine a sufficient time delay period before initiating and/or repeating a trip attempt.

The time delay is dependent upon the current present in the current transformer secondary circuit, as this current is used to build up the stored energy that is used to engage the tripping mechanism. As this current increases, the time required to store the necessary tripping energy decreases, and as this current decreases, the time required to store the necessary tripping energy increases.

For a typical protective device, for example, a small electronic self-powered adjustable-range overload relay, it would take about 75% of the Full Load Amperage (FLA) at the minimum of the adjusted range to wake up the electronics, whereas the minimum current that a trip might be desired at would be above 100% of minimum FLA. The current transformers 22 used in such a device are designed to produce sufficient secondary current to power the electronics at 75% of minimum FLA. This current is used to charge the power supply capacitor 58 which provides the necessary tripping energy. Thus, the time required to store the energy required for a successful trip is different and dependent on the amount of current flowing in the transformer 22 secondary, and a circuit using such a time delay requires that the time delay be variable and set according to the current level of the transformer 22 secondary.

In FIG. 6, the voltage present on the lead 120 is directly proportional to the secondary current from the current transformers 22 and its voltage can be used to control the charging rate of a trip delay capacitor 124. The trip delay capacitor 124 is charged with a current that is small in comparison with the current that is available to charge the power supply capacitor 58. This minimizes the impact upon the time required to charge the power supply capacitor 58, thereby minimizing any additional time delay added before sufficient tripping energy is stored by the power supply capacitor 58. Referring to the upper left portion of FIG. 6, the resistors 131, 132, 133, and 134, the operational amplifier 135, and transistor 136 are arranged to provide a voltage-controlled current source. The values of the resistors 131, 132, 133, 134 are chosen to provide the required current corresponding to the voltage on the lead 120. In a conventional voltage-controlled current source configuration, a similar arrangement is used but with the base of the transistor 136 connected directly to common (ground). A reference (or Zener) diode 138 is used in place of a direct connection to ground to increase the available voltage at the collector of the transistor 136 to above a 1.25 Volt threshold ($V_{1.2}$), which will be required on trip delay capacitor 124 before a trip may occur. The voltage across the capacitor 124 increases at a rate that is proportional to the voltage output at lead 120 which, in turn, is proportional to the current in the secondary of the current transformers 22. Therefore, the rate of charge of the trip delay capacitor 124 is proportional to the current in the secondary of the current transformer 22.

When the voltage across the trip delay capacitor 124 reaches the 1.25 Volt reference level, the output of a comparator 146 swings HIGH, commanding the solenoid driver circuit 54 to engage the solenoid and interrupt the current in the three-phase circuit path.

A transistor 148 and resistors 150 and 156 are used to initiate the delay when a trip request has been signaled by the trip signal TS from the trip level comparator 50. An active HIGH trip request signal is inverted by a pair of resistors 160 and 162 and a transistor 164 so that the trip request signal is suitable to drive the base of the transistor 148. When the trip request signal is received, the transistor 164 turns ON and this turns the transistor 148 OFF. This allows the current from the voltage-controlled current source to charge the trip delay capacitor 124, which provides the appropriate time delay for comparator 146. Preferably, the trip signal TS is received to indicate that a phase loss or overload has been detected. For example, a trip signal TS provide by the circuitry illustrated and described by the U.S. patent application No. 08/143,948, entitled "Self-Powered Circuit Interruption Arrangement", supra, is suitable.

A diode 170 is included to prevent the trip delay capacitor 124 from inadvertently discharging should the trip signal TS generated by the trip level comparator 50 momentarily become inactive, thereby turning on the transistor 148. This would result in an undesired extra delay condition.

When a trip occurs, the trip delay capacitor 124 must be fully discharged to reset the delay function. Feedback from the output of the solenoid driver 54 is used to control the base of a transistor 174, via base resistors 176 and 178, to discharge the trip delay capacitor 124 immediately after a trip has been initiated. The solenoid driver 54 holds its output HIGH for a sufficient period of time to both engage the tripping solenoid and to discharge the trip delay capacitor 124. A resistor 180 has a value which is selected to discharge the trip delay capacitor 124 at a rate equivalent to the rate at which the power supply capacitor 58 is discharged by the powering of the overload relay circuitry. For example, if the current draw of the overload relay is about 0.5 milliampere and the value of the power supply capacitor 58 is 220 microfarads, then the value of the resistor 180 can be selected to be 5.28 kΩ for a trip voltage at 1.2v assuming that the value of the capacitor 124 is 100 microfarads.

In another embodiment, a one-shot timer 184 (shown in dotted lines) and diodes 187 and 188 are inserted between the output of trip level comparator 50 of FIG. 3a and the solenoid driver 54. Diodes 187 and 188 are OR-tied so that both the one-shot timer 184 and the comparator 146 can actuate the solenoid driver 54. Using the one-shot timer 184 in this manner causes the solenoid driver 54 to make a first attempt at tripping the unit immediately after the trip level comparator 50 generates the trip signal TS, and if this attempt was not successful, to fall back on the normal time delay routine described above.

In an exemplary embodiment, the following values are used for the components shown in the circuit of FIG. 6:

| | |
|---|---|
| resistor 131: | 17 kΩ |
| resistor 132: | 17 kΩ |
| resistor 133: | 17 kΩ |
| resistor 134: | 17 kΩ |
| resistor 137: | 100 kΩ |
| resistor 150: | 120 kΩ |
| resistor 156: | 120 kΩ |
| resistor 160: | 120 kΩ |
| resistor 162: | 100 kΩ |
| resistor 176: | 120 kΩ |
| resistor 178: | 100 kΩ |
| resistor 180: | selected as described |
| capacitor 124: | 100 µF | and the comparators 50 and 146 may be implemented using an OP290GP type component available from Analog Devices, Inc.

Figure 7:
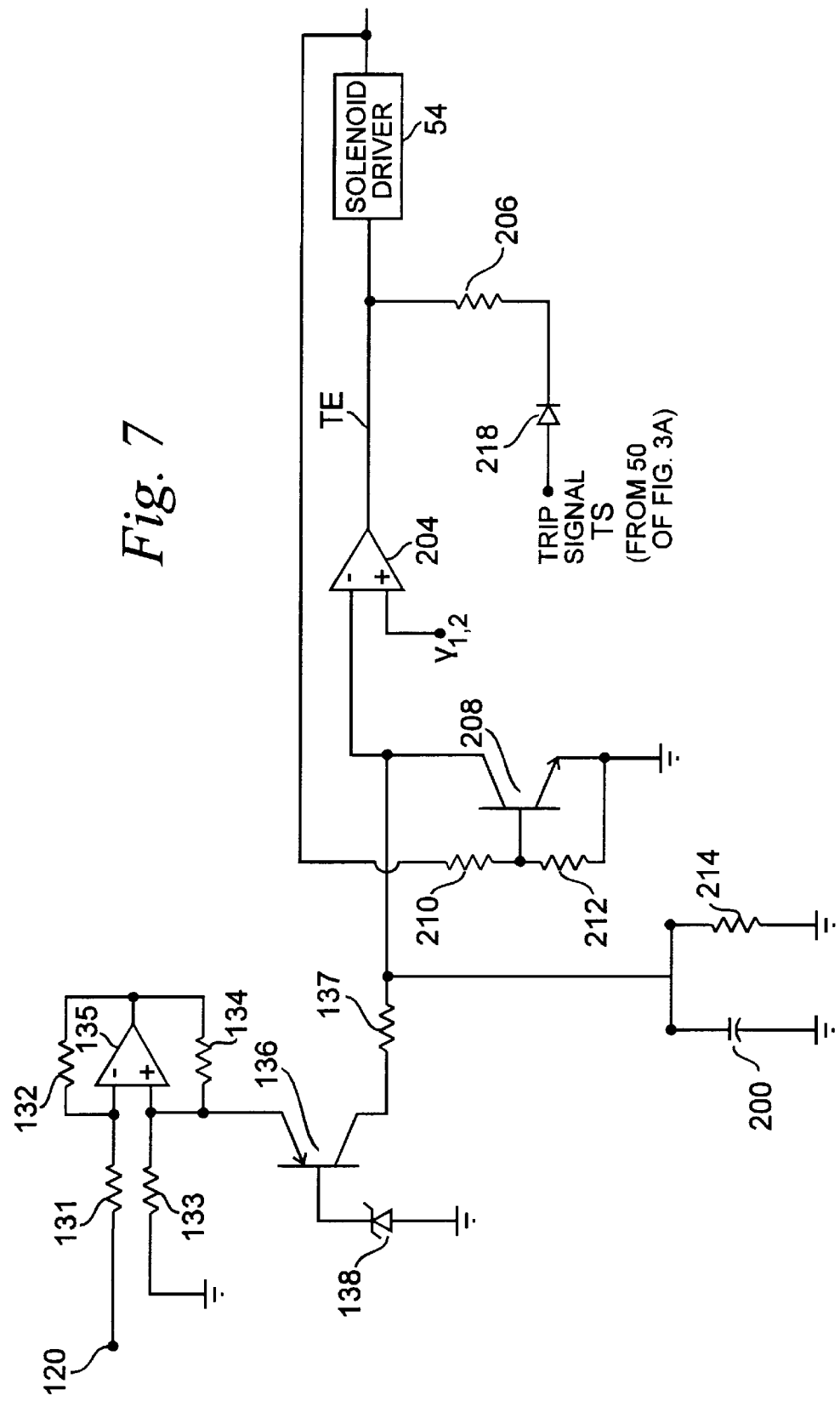

Referring now to FIG. 7, a fourth implementation of the undervoltage lockout circuit 52 of FIG. 3a is depicted. In this implementation, rather than monitoring the voltage directly on the power supply capacitor 58, the voltage accumulated on the power supply capacitor is modeled using a modeling capacitor 200 and a trip enable signal TE is provided when sufficient energy has been stored. The voltage developed on the modeling capacitor 200 is dependent upon the current present in the current transformer 22 secondary circuit, because this current is used to build up the stored energy used to engage the tripping mechanism. As this current increases, the rate of energy storage increases; and, as this current decreases, the rate of energy storage decreases. For this reason the voltage present on the lead 120 (also shown in the alternate embodiment of FIG. 6) is brought directly into a voltage-controlled current source, using the same circuitry shown in FIG. 6 and including operational amplifier 135, resistors 131–134, and 137, transistor 136, and Zener diode 138.

The voltage-controlled current source uses the voltage on the lead 120 to control the charging rate of the modeling capacitor 200 by providing a current that is small compared to the current that is available to charge the power supply capacitor 58. In this way, there is a minimal impact upon the time required to charge the power supply capacitor 58, thereby minimizing any additional delay added before sufficient tripping energy is stored. The voltage across the capacitor 200 increases at a rate that is proportional to the current that is output from the current source, which is proportional to the voltage on the lead 120, which is proportional to the current in the secondary of the current transformers 22. Therefore, the rate of charge of the capacitor 200 is proportional to the current in the secondary of the current transformer 22, and when the voltage across the capacitor 200 reaches the 1.2 Volt reference at the positive input terminal of an open collector comparator 204, the comparator 204 output switches from a ON to an OFF state, providing the trip enable signal TE. The output of comparator 204 indicates to the solenoid driver 54 that the power supply capacitor 58 has stored sufficient energy to successfully engage the tripping solenoid. The solenoid driver 54 also provides a discharge-control signal to a transistor 208, via bias resistors 210 and 212, which discharges the capacitor 200 when a trip occurs.

A resistor 214 is used to discharge the capacitor 200 at a rate that is equivalent to the rate at which the power supply capacitor 58 is discharged by the powering of the overload relay circuitry.

The solenoid driver 54 is therefore instructed to actuate the solenoid via trip signal TS from trip level comparator 50 as discussed in connection with FIG. 6, and via a diode 218, a resistor 206 and the output of the comparator 204. The trip signal TS is prevented from controlling the solenoid driver 54 by the trip enable signal TE from the output of open collector comparator 204 when the voltage on the capacitor 200 is less than 1.2v.

In an exemplary embodiment, the following component values are used for the unique components shown in the circuit of FIG. 7:

| | |
|---|---|
| resistor 206: | 100 kΩ |
| resistor 210: | 120 kΩ |
| resistor 212: | 100 kΩ |
| capacitor 200: | 100 μF |

The resistor 214 is selected in the same way as the resistor 180 of FIG. 6.

Figure 8:
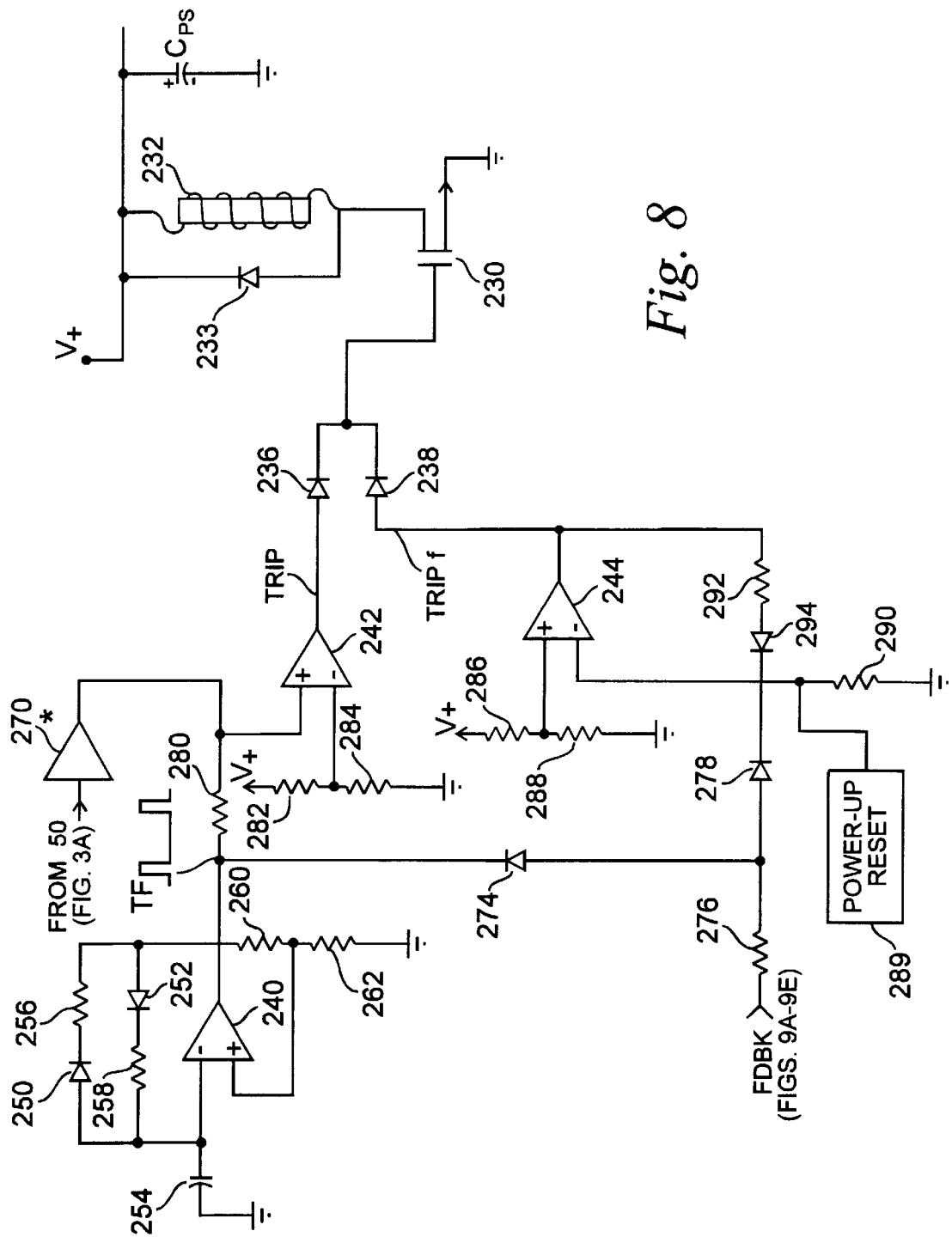

Referring now to FIG. 8, a fifth implementation of the undervoltage lockout circuit 52 of FIG. 3a is depicted. This implementation assures a successful tripping cycle without measuring the power supply capacitor 58 voltage. In this implementation, a short current pulse is sent to the solenoid coil 232, immediately after which the status of the solenoid is evaluated using one of various types of feedback. Based on this solenoid feedback, an unsuccessful trip attempt can be detected and the trip can be attempted again after the power supply capacitor Cps has been fully recharged.

When the solenoid engagement switch (shown in FIG. 8 as a FET 230) is ON, the power supply capacitor Cps is discharged into the solenoid coil 232, actuating the mechanism and executing a trip. The FET 230 is forced ON whenever "TRIP" or "TRIPF" is in the HIGH state by connecting these signals to the gate of the FET 230 through diodes 236 and 238. The "TRIP" or "TRIPF" signals are controlled using: a timing function centered about an operational amplifier 240; a trip arbitration function including a comparator 242; a solenoid feedback latching function including amplifier 244; and a solenoid feedback control signal "FDBK" provided using one of the circuits shown in FIGS. 9a–9e. Each of the comparators shown in FIG. 8 can be implemented using an IM311, or similar type component.

The timing function involves using the operational amplifier 240, along with diodes 250 and 252, a capacitor 254 and resistors 256, 258, 260 and 262, to provide a continuous-running, variable duty-cycle square-wave output, TF, having a period of about one second and consisting of a brief high-level pulse followed by a relatively long low-level pulse. Whenever the square wave is HIGH, the FET 230 is ON provided that the high-level trip request signal at the input of the tri-state comparator 270 is present. The amplifier 240 can be implemented using, for example, the OP-type amplifiers available from Analog Devices, Inc.

The duration of the high-level pulse at the output of the amplifier 240 is chosen to provide enough system change to develop the solenoid feedback signals associated with FIGS. 9a–9e without draining the power supply capacitor Cps to an intolerably low level which would require a long recharging time. The time between the high-level pulses is chosen to allow the power supply capacitor Cps sufficient time to recharge at a minimum charging current before attempting a subsequent trip.

The trip arbitration function involves forcing the FET 230 to the ON state whenever the output of the comparator 242 (TRIP) is HIGH. This occurs when the timer output from the operational amplifier 240 is HIGH and the trip request signal forces the tri-state comparator 270 into the enable state (high impedance). Otherwise, the output of the comparator 242 is in the LOW state. A pair of voltage dividing resistors 282 and 284 are used to provide a reference signal about which the comparator 242 detects the level of the signal output from the tri-state comparator 270.

With respect to the solenoid feedback latching function, the amplifier 244 acts as a latch to maintain the TRIPF signal in the HIGH state when the FDBK signal at the negative terminal input of the amplifier 244 is HIGH and the output of the amplifier 240 is HIGH. Voltage dividing resistors 286 and 288 are used to provide a reference signal about which the comparator 244 detects the level of the signal at its negative input terminal. A diode 274 is in series with a line between the FDBK signal, via a resistor 276, and the negative input terminal of the amplifier 244, via a diode 278, to ensure that the output for the amplifier 244 is disabled if the output of the amplifier 240 is LOW.

When the overload relay 10 is powered up, a power-up reset circuit 289 is used to control the negative input terminal of the comparator 244 at a HIGH level until the power supply capacitor Cps develops a full charge for 5 operating the overload relay 10. This maintains the output of the comparator 244 at a LOW level, thereby preventing a false trip request signal from controlling the FET 230.

The solenoid feedback signal "FDBK", provided using one of the circuits of FIGS. 9a–9e, indicates whether there is sufficient energy for the contactor to successfully complete the interruption of the three-phase circuit path in response to an attempted interruption initiated by the brief high-level pulse of the variable duty-cycle square-wave output TF in conjunction with the high-level trip request at the input of the tri-state comparator 270. In each of the circuits of FIGS. 9a–9e, the FET 230 of FIG. 8 is illustrated functionally in FIGS. 9a–9e as a switch 298 (e.g., a relay, SCR or bipolar transistor circuit). Further, the solenoid coil 232, the power supply capacitor Cps and the solenoid's plunger 300 are shown as in FIG. 8.

Figure 9E:
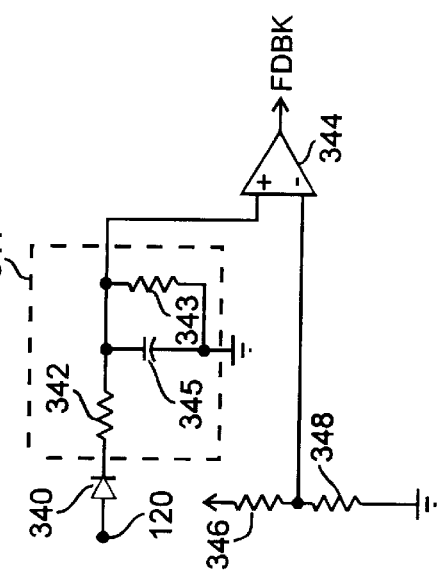
FIGS. 9a–9e are illustrations of a feedback circuit used with the implementation of FIG. 8.
Figure 9D:
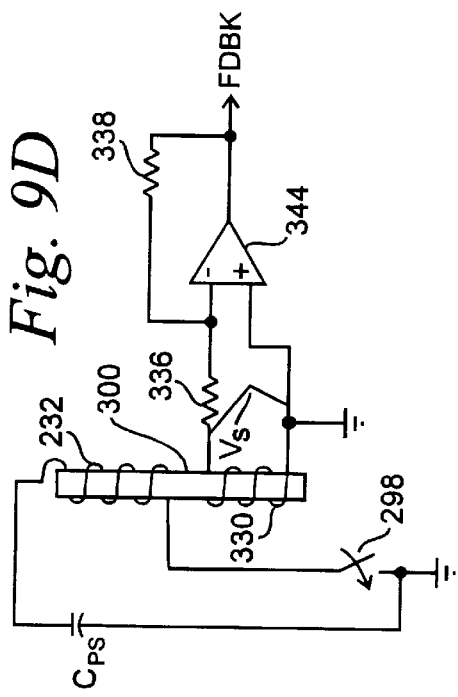
Figure 9B:
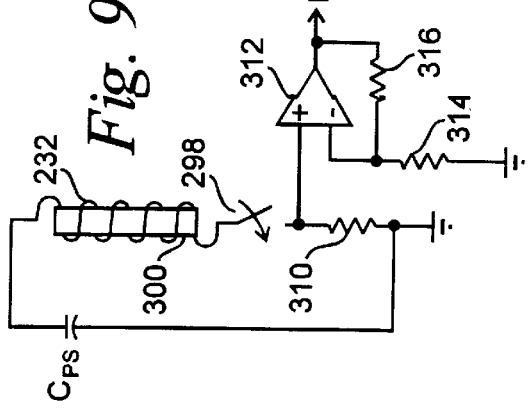
Figure 9A:
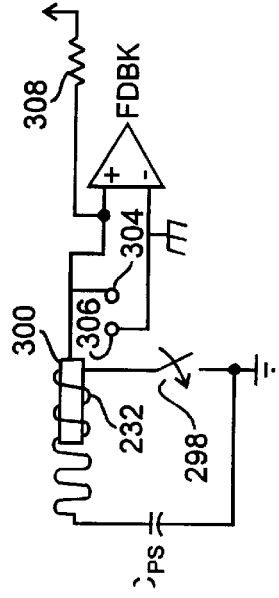

Referring now to FIG. 9a, the solenoid feedback circuit is shown using a pair of mechanical contacts 304 and 306. The contact 304 is physically attached to the plunger 300 such that it moves with the plunger 300 while the contact 306 is fixed such that it does not move with the plunger 300 and is spaced a predetermined distance away from the contact 304 when the plunger 300 is in the non-energized position. When the solenoid coil 232 is activated with energy sufficient to complete the trip, the plunger 300 is thrust forward with sufficient speed to cause the contacts 304 and 306 to close within a predetermined time (high-level pulse duration of the timing circuit) thereby producing a solenoid feedback signal FDBK indicating that there is sufficient energy stored in the power supply capacitor Cps to complete the trip. If the energy stored in the power supply capacitor Cps is not sufficient to complete the trip, the contacts 304 and 306 will not close within the predetermined time and the solenoid feedback signal FDBK will indicate that there is insufficient energy stored in the power supply capacitor Cps to complete the trip. In the event that there is insufficient energy stored in the power supply capacitor Cps to complete the trip a pull-up resistor 308 will ensure that the solenoid feedback signal FDBK will remain HIGH thereby aborting the trip attempt at the start of the low-level pulse of the variable duty-cycle square-wave output TF. This action will prevent the power supply capacitor Cps from discharging completely and reduce the time required for fully recharging the power supply capacitor Cps.

In FIG. 9b, the solenoid feedback function is provided by monitoring the actual solenoid current through the solenoid coil 232. The current in the solenoid coil 232 rises approximately linearly during the early stages of an actual trip event. Thus, if the current is above a minimum selected threshold value during a prescribed time period, chosen so that the current rises to the upper limit of the linear track, then the power supply capacitor Cps has sufficient energy to complete the trip. A resistor 310 is used in series with the coil 232 and the switch 298 to develop a corresponding voltage which is used by a conventional amplifier circuit, including operational amplifier 312 and resistors 314 and 316 to provide the solenoid feedback signal FDBK to the circuit of FIG. 8.

Figure 9C:
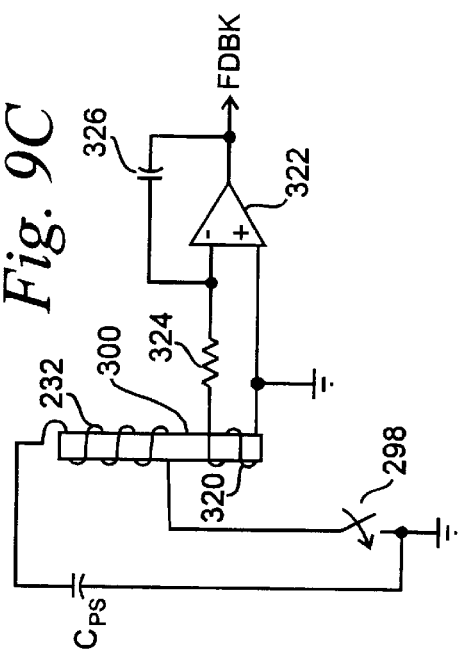

In FIG. 9c, the solenoid feedback function is provided by monitoring the flux developed as current is sent through the solenoid coil 232. The flux linkages are a function of the current flowing in the solenoid coil 232 and the position of the plunger 300 with respect to the coil 232. As the plunger 300 is pulled further into the solenoid coil 232 by the increasing current flow in the coil 232, the flux increases. Therefore, the force (energy stored in the power supply capacitor Cps) actuating the solenoid is proportional to the magnetic flux. A signal proportional to the flux can be generated by integrating the signal derived from a sense-winding coil 320 wound around the plunger 300. The output of the sense winding coil 320 is connected to an operational amplifier 322 which uses a resistor 324 and a capacitor 326 arranged to integrate the input and to generate an output signal proportional to the flux. If the signal is above a minimum selected threshold value during the high-level pulse of the variable duty-cycle square-wave output TF, the system has sufficient energy to complete the trip. The operational amplifier 322 can be implemented using a single-supply operational amplifier by selecting the polarity of the sense voltage from the sense-winding coil 320 to be negative.

In FIG. 9d, the solenoid feedback function is provided by using a sense-winding coil 330 to monitor the rate at which the flux is rising as current is sent through the solenoid coil 232. The voltage Vs across the output of the sense-winding coil 330 is proportional to the rate at which flux is rising in the circuit. If the flux rise is sufficiently high during the high-level pulse of the variable duty-cycle square-wave output TF, the system has sufficient energy to complete the trip. The sense-winding coil 330 is implemented such that it does not create a simple transformer and, therefore, measures the power supply capacitor Cps voltage only indirectly. The signal produced at the output of the sense-winding coil 330 is proportional to the power supply capacitor Cps voltage minus the resistive voltage drop of the solenoid coil 232. Therefore, the sense-winding 330 produces a voltage directly proportional to the power supply capacitor Cps only during the first instant after switch closure. This proportional voltage is then amplified using an operational amplifier 334 having an amplification factor established by resistors 336 and 338.

In FIG. 9e, the solenoid feedback function is provided by monitoring a signal proportional to the motor current, which is available in the load requiring the trip. One way to obtain the signal proportional to the motor current is to use the lead 120 from the interconnection of the negative outputs of the three-phase rectifier 42 (shown in FIG. 3a). By conditioning the signal on the lead 120 using a current blocking diode 340 and a conventional resistor-capacitor network filter 341, a comparator 344 can compare the signal to a reference voltage developed between voltage dividing resistors 346 and 348.

Under normal running conditions, e.g., greater than thirty percent of minimum current, the negative input of the comparator 344 is higher than the reference voltage at the positive input and the FDBK output signal is LOW. When a successful trip is achievable, the voltage on the lead 120 falls to a negligible level and the output of the comparator 344 changes state to a HIGH level, thereby signaling that a successful trip will occur.

Accordingly, the solenoid is activated using the FDBK signal through the diode "OR" logic established by the arrangement of diodes 236 and 238 (FIG. 8) whenever TRIP is HIGH, indicating an appropriately-timed request for a trip, or TRIPF is HIGH indicating that sufficient energy has accumulated before a reattempt to trip occurs.

Turning now to FIG. 10, another approach is illustrated for overcoming the problems associated with self-powering an electronic overload relay. A significant advantage with this approach is that the current transformers are not required to develop the power supply as well as maintain a reasonable accuracy of the measured current. Rather, the current transformers are only required to measure the current in the three-phase circuit path, thereby permitting the size and cost of the current transformers to be significantly reduced for the same accuracy requirements. Since the current transformers are major components, the size and cost of the complete overload relay is substantially benefited.

The benefit is particularly noticeable at low current levels (e.g., ARMS of motor current and below). Furthermore, to keep the current transformer size and cost reasonable, the electronic circuit must minimize the amount of current required from the power supply. At the low motor-current ranges, the amount of current drawn by the electronic circuitry is so low that it is typically impractical to even drive light emitting diodes (LEDs) to indicate if the unit is powered up or is in the tripped condition.

The approach of FIG. 10 solves these problems, insofar as the approach: does not require a separate power supply and does not require additional electrical connections; minimizes the size and costs of the current transformers, thereby reducing the size and cost of the complete unit; and provides sufficient power to operate indicating LEDs. Because sufficient power is available to drive indicating LEDs, one or more LEDs can be used to indicate "Power On", "Running", or "Not Tripped" conditions.

The arrangement of FIG. 10 includes a power supply 350 for extracting power from the three-phase circuit path using the connections between the conductors 14 (of FIG. 1) and the overload relay 10 (of FIG. 1). The arrangement further has an electronic control 352 which includes the arrangement of FIG. 3a less the power supply 38 and the undervoltage lockout circuit 52. For this arrangement, the overload relay 10 would have input and output terminals (not shown) for interfacing with the conductors 14 as opposed to pass-through windows as shown in FIG. 1. Thus, the arrangement shown in FIG. 3a is modified by drawing current for the power supply 38 directly from the input or output terminals connecting the three-phase circuit path to the overload relay 10, and by eliminating the need for the lockout circuit 52. The trip command generated to actuate the solenoid is voltage-divided by resistors 353 and 354 for controlling a switch 355 (shown as a bipolar transistor), which in turn draws current through the solenoid coil (or relay) 356. A flyback diode 357 is used, as previously described.

In one embodiment, the power supply can be implemented as shown in FIG. 11, using the line-to-line motor voltage available via the overload relay's input and output terminals (not shown). In this case, the voltage from the three phases is rectified via a three-phase rectifier 360 to ensure that the overload will still operate if any one of the three phases are lost. The rectified voltage at the output of the rectifier 360 is applied to a shunt-regulating zener diode 362 with a resistor 364 and a capacitor 366 arranged and value-selected to minimize the wattage dissipated in the resistor 364 while still maintaining a reasonable time constant for the power supply to be established. For a range of overload relays that can operate from 230 to 600 VRMS three phase, the value of the resistor 364 can be selected at 1 MΩ and the capacitor 366 at 100 microfarads to give a power dissipation in the resistor 364 of less than 1 watt at 600 volts and still maintain a time constant of 1.5 seconds at 230 volts.

In the embodiment of FIG. 12, the power supply 350 is shown using a single line 370 connected to one of the three-phase conductors 14. A diode 372 is used to rectify the current drawn over the line 370 and charge a power supply capacitor 374 to supply the power supply voltage Vps for the electronic control 352 of FIG. 10. By tapping off the capacitor 374 via a resistor 375, a light emitting diode (LED) 376 is used to indicate the presence of power to the system user.

The embodiment of FIG. 13 also shows the power supply 350 using a single line 370 connecting to one of the three-phase conductors 14. In place of the capacitor 374 and resistor 375 of FIG. 12, a boost regulator 380, such as the Lambda 6350 switching regulator and associated passive components, is used to provide the regulated supply voltage Vps.

In considering the advantages and disadvantages of each of these implementations, the implementation of the power supply 350 of FIG. 11 will continue to operate after one of the phases have been lost, whereas the implementation of FIGS. 12 and 13 are dependent upon the phase current connected to line 370.

Figure 14:
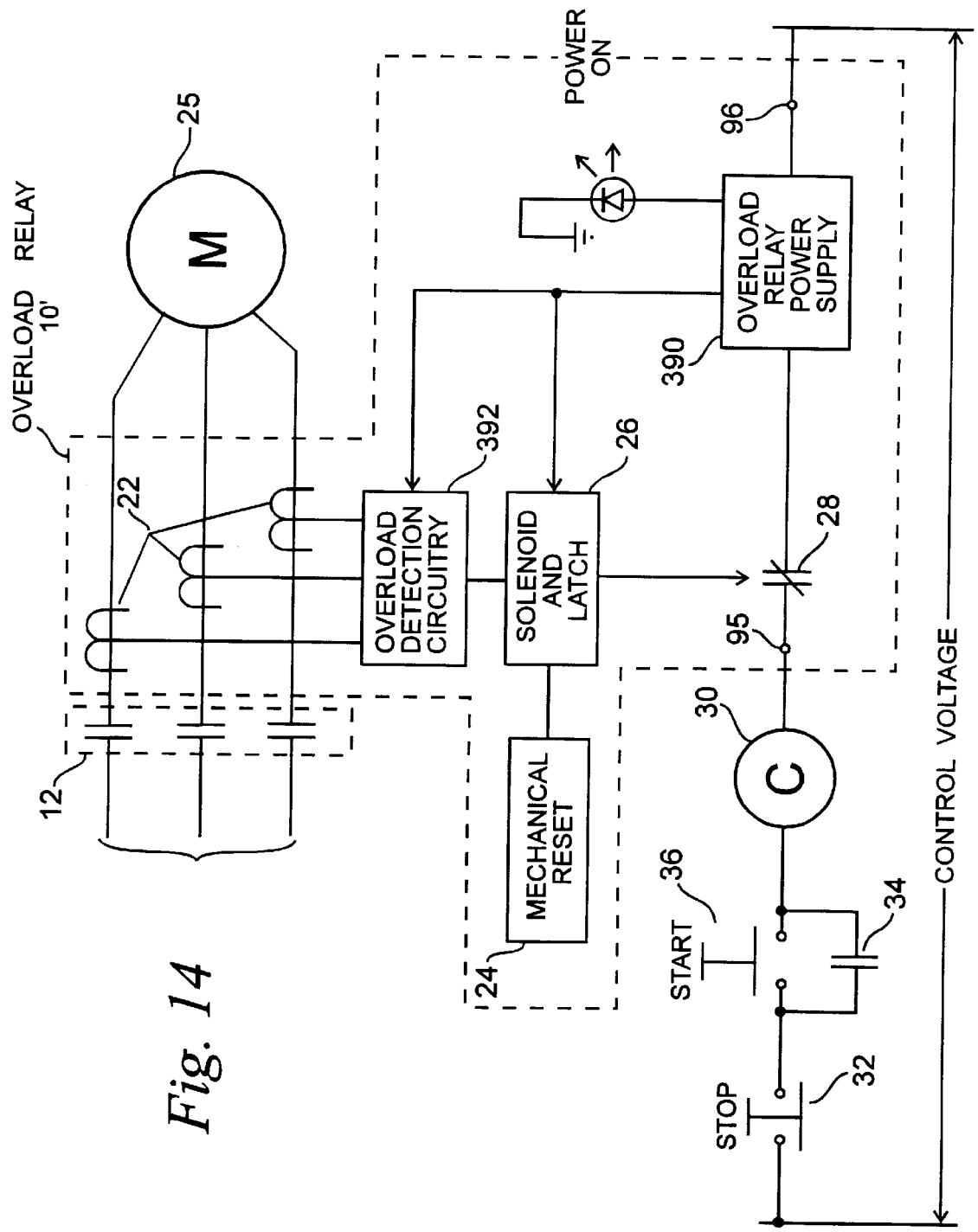
FIG. 14 is a schematic of an implementation for extracting operating power for the overload relay from the control circuit operating the contactor coil, according to the present invention.
Figure 15:
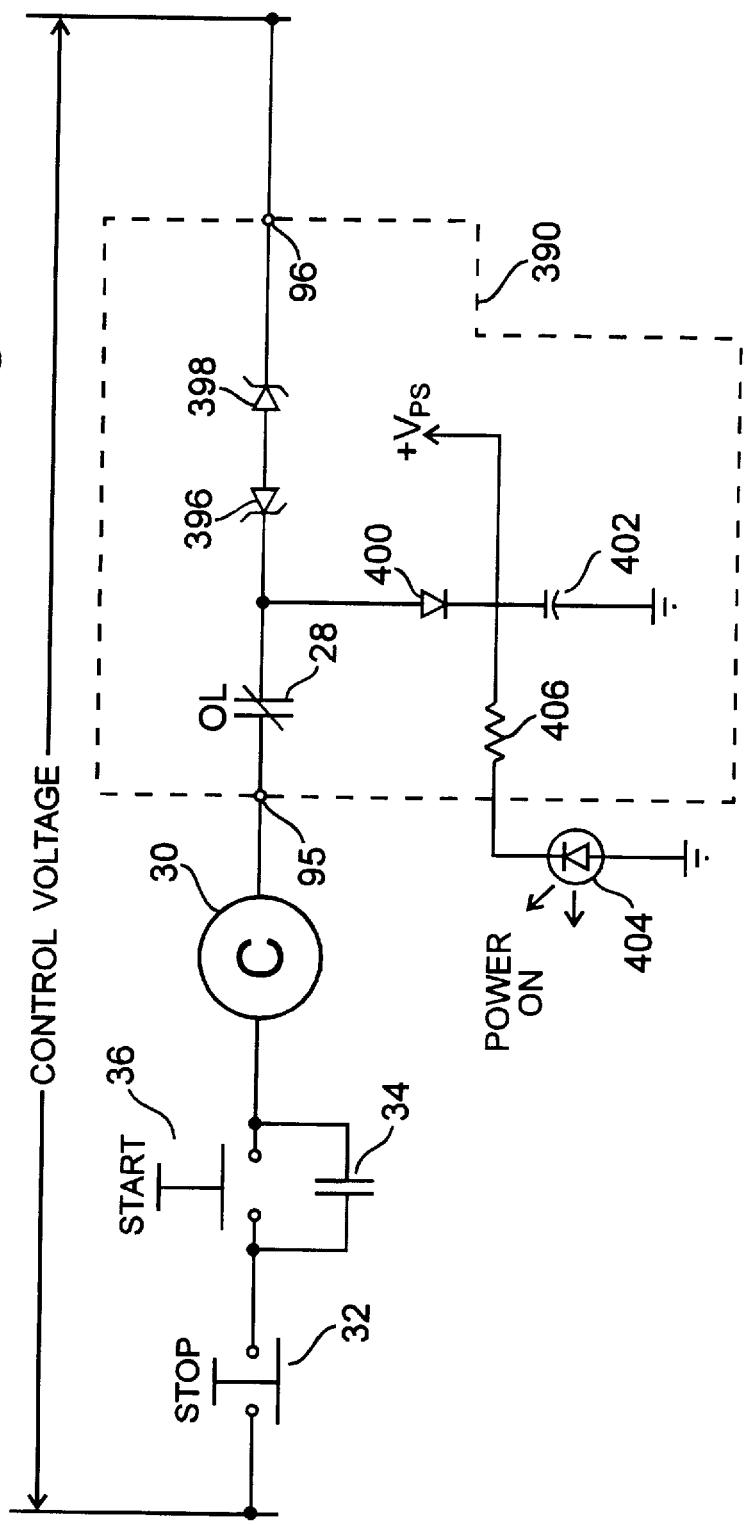
FIG. 15 is a schematic of the implementation of FIG. 14.

The arrangements of FIGS. 14 and 15 illustrate a modification of the arrangement shown in FIG. 2, in accordance with the present invention, for extracting operating power from the contactor control circuit operating the contactor coil 30. In FIG. 14, the power supply 390 for the overload relay is arranged in series with the overload contacts (terminals 95 and 96), and the overload detection circuitry 392 is a separate circuitry block operating from the power extracted via the power supply 390. FIG. 15 illustrates the power supply 390 as including two zener diodes 396 and 398 (of equal voltage ratings) placed back-to-back in series between the customer terminals 95 and 96 to avoid applying a voltage to the coil 30 with a DC offset. The connection to the power supply output voltage Vps is made between the overload contacts 28 and the zener diode 396, via a diode 400, to charge a capacitor 402. Because of the additional power provided by this arrangement, a LED 404 may be used as a power-ON indicator.

In place of the combination of the resistor 406 and the capacitor 402, a boost regulator (such as 380 of FIG. 13), which responds to low voltage and high current levels, can be used to provide the "+Vps" output having low current and high voltage levels.

Since the power supply 390 is in series with the contactor coil 30, it is preferably designed so that an appreciable voltage is not robbed from the contactor coil 30, thereby affecting the pick-up and drop-out levels (voltage or time) of the contactor. Also, the power supply 390 is preferably designed to handle the series current of the contactor coil (including the high in-rush current associated with pick-up) without over dissipation.

In an exemplary application, this circuit of FIGS. 14 and 15 will operate with contactor coil voltages ranging from 120 to 600 VAC over a range of contactor sizes from NEMA sizes 00 to 3, with the overload contacts 28 implemented using Aromat STIE-L2-DC5V or equivalent, the zener diodes 396 and 398 implemented using a 5.1 Volt, 5 Watt 1N5338B providing a DC voltage for power supply 390, and the capacitor 402 implemented using a 100 μF electrolytic capacitor.

Accordingly, a number of self-powered circuit interruption arrangements have been disclosed, each embodying the principals of the present invention and providing high-end performance in terms of current transformer selectivity and accuracy in detecting fault conditions. Those skilled in the art will readily recognize that various modifications and changes may be made to the present invention without strictly following the exemplary circuits illustrated and described herein. For example, various combinations of the above-described circuits for overcoming the problems associated with self-powering an overload relay may be used, and a variety of interchangeable components may be used in place of the circuitry shown. Such changes would not depart from the true spirit of the present invention, which is set forth in the following claims.

We claim:

1. A circuit interrupter arrangement for interrupting current in circuit path, comprising:
   a current inducer circuit for providing a current signal having a magnitude corresponding to the current in the circuit path;
   a power supply operating from the current signal provided by the current inducer circuit and providing a voltage signal relative to common;
   a solenoid mechanism having a coil through which current from the power supply passes to cause interruption of the current in the circuit path;
   a trip command circuit, responsive to a fault in the circuit path and including an overload detector, for sending an electrical signal commanding that the circuit path be interrupted;
   an electrical latch actuated in response to both the electrical signal from the trip command circuit and the voltage signal exceeding a predetermined value, the electrical latch arranged in series with the coil between the power supply and common and including a first terminal coupled to the trip command circuit and a second terminal coupled to the power supply; and
   a prevention circuit constructed and arranged to prevent one of the electrical signal from the trip command circuit or the voltage signal from engaging the electrical latch until the voltage signal exceeds the predetermined value.

2. A circuit interrupter arrangement, according to claim 1, wherein the prevention circuit is arranged in series with the trip command circuit and the first terminal of the electrical latch.

3. A circuit interrupter arrangement, according to claim 1, wherein the prevention circuit is arranged in series with the coil, the power supply and the second terminal of the electrical latch.

4. A circuit interrupter arrangement, according to claim 2, wherein the prevention circuit includes a silicon unilateral switch.

5. A circuit interrupter arrangement, according to claim 3, wherein the prevention circuit includes a silicon unilateral switch.

6. A circuit interrupter arrangement, according to claim 2, wherein the prevention circuit includes a FET.

7. A circuit interrupter arrangement, according to claim 1, wherein the electrical latch includes an SCR.

8. A circuit interrupter arrangement, according to claim 1, wherein the trip command circuit further includes a phase-loss detector.

9. A circuit interrupter arrangement for interrupting current in a multi-phase circuit path, comprising:
   a current circuit, including a plurality of current transformers and at least one rectifier, for providing a current signal having a magnitude corresponding to the current in the circuit path, each current transformer respectively inducing current from the multi-phase circuit path;
   a power supply including a capacitor charged to a predetermined value from the current signal provided by the current circuit and providing a voltage signal relative to common;
   a solenoid mechanism having a coil through which current discharging from the capacitor passes to cause interruption of the current in the circuit path;
   a trip command circuit, responsive to a fault in the circuit path and including an overload detector, for sending an electrical signal commanding that the circuit path be interrupted;
   an electrical latch actuated in response to both the electrical signal from the trip command circuit and the voltage signal exceeding the predetermined value, the electrical latch arranged in series with the coil between the power supply and common and including a first terminal coupled to the trip command circuit and a second terminal coupled to the power supply; and
   a prevention circuit constructed and arranged in series with the trip command circuit and the first terminal of the electrical latch to prevent the electrical signal from the trip command circuit from engaging the electrical latch until the voltage signal exceeds the predetermined value.

10. A circuit interrupter arrangement, according to claim 9, wherein the prevention circuit includes a silicon unilateral switch.

11. A circuit interrupter arrangement, according to claim 9, wherein the prevention circuit includes a FET.

12. A circuit interrupter arrangement, according to claim 9, wherein the electrical latch includes an SCR.

13. A circuit interrupter arrangement, according to claim 9, wherein the trip command circuit further includes a phase-loss detector.

14. A circuit interrupter arrangement for interrupting current in a multi-phase circuit path, comprising:
   a current circuit, including a plurality of current transformers and at least one rectifier, for providing a current signal having a magnitude corresponding to the current in the circuit path, each current transformer respectively inducing current from the multi-phase circuit path;
   a power supply including a capacitor charged to a predetermined value from the current signal provided by the current circuit and providing a voltage signal relative to common;
   a solenoid mechanism having a coil through which current discharging from the capacitor passes to cause interruption of the current in the circuit path;
   a trip command circuit, responsive to a fault in the circuit path and including an overload detector, for sending an electrical signal commanding that the circuit path be interrupted;
   an electrical latch actuated in response to the electrical signal from the trip command circuit and the voltage signal exceeding the predetermined value, the electrical latch arranged in series with the coil between the power supply and common and including a first terminal coupled to the trip command circuit and a second terminal coupled to the power supply; and
   a prevention circuit constructed and arranged in series with the coil and the power supply to prevent the electrical latch from being engaged until the voltage signal exceeds the predetermined value and the electrical signal from the trip command circuit is present at the first terminal.

15. A circuit interrupter arrangement, according to claim 14, wherein the prevention circuit includes a silicon unilateral switch.

16. A circuit interrupter arrangement, according to claim 14, wherein the electrical latch includes an SCR.

17. A circuit interrupter arrangement, according to claim 16, wherein the first terminal is a gate terminal to which a voltage is applied to activate the SCR.

18. A circuit interrupter arrangement, according to claim 14, wherein the trip command circuit further includes a phase-loss detector.

19. A circuit interrupter arrangement for interrupting current in a circuit path, comprising:

a current inducer circuit for providing at least one current signal induced from the circuit path and having a magnitude corresponding to the current in the circuit path;

a power supply including a capacitor being charged to a predetermined value over a prescribed minimum period of time by a first current signal of said at least one current signal provided by the current inducer circuit and providing a voltage signal relative to common;

a trip command circuit, responsive to a fault in the circuit path, for sending an electrical signal commanding that the circuit path be interrupted by using the voltage signal provided by the power supply;

an electrical latch actuated in response to the electrical signal from the trip command circuit; and a control circuit responsive to said at least one current signal provided by the current inducer circuit, arranged for preventing the electrical signal from engaging the latch until after the prescribed minimum period of time.

20. A circuit interrupter arrangement, according to claim 19, wherein said at least one signal includes a second current signal coupled to drive a voltage-controlled current source.

21. A circuit interrupter arrangement, according to claim 20, wherein the voltage-controlled current source is arranged to charge a trip delay capacitor.

22. A circuit interrupter arrangement, according to claim 21, wherein the voltage controlled current source is arranged to charge the trip delay capacitor at a rate proportional to the magnitude of the first current signal.

23. A circuit interrupter arrangement, according to claim 21, further including a feedback circuit responsive to the trip command circuit, for completely discharging the trip delay capacitor immediately after the circuit path is interrupted.

24. A circuit interrupter arrangement, according to claim 20, wherein the voltage-controlled current source is arranged to charge a modeling capacitor at a rate proportional to the magnitude of the first current signal.

25. A circuit interrupter arrangement, according to claim 24, further including a circuit to completely discharge the modeling capacitor immediately after the circuit path is interrupted.

26. A circuit interrupter arrangement, according to claim 19, further including a one-shot timer circuit arranged and constructed for overriding the control circuit to initiate a first trip attempt immediately after the trip command circuit sends the electrical signal commanding that the circuit path be interrupted.

27. A circuit interrupter arrangement, according to claim 19, wherein the trip command circuit further includes an overload detector.

28. A circuit interrupter arrangement, according to claim 19, wherein the trip command circuit further includes a phase-loss detector.

29. A circuit arrangement for interrupting current in a circuit path, comprising:

a current inducer circuit for providing a current signal having magnitude corresponding to the current in the circuit path;

a power supply operating from the current signal provided by the current inducer circuit and providing a voltage signal relative to common;

a trip command circuit, responsive to a fault in the circuit path, for sending an electrical signal commanding that the circuit path be interrupted by using the voltage signal provided by the power supply;

a circuit interruption circuit, including a circuit interrupting mechanism, actuated in response to the trip command circuit when the power supply has provided the voltage signal at a sufficient magnitude to actuate the circuit interrupting mechanism;

a timing circuit producing a current pulse having a particular high-level duration and a particular low-level duration;

a solenoid feedback circuit, responsive to a mechanical or an electrical change in the circuit interruption circuit caused by the high-level duration of the current pulse from the timing circuit; and a feedback controlled circuit, responsive to a signal from the solenoid feedback circuit, for selectively causing the electrical signal from the trip command circuit to be continued or discontinued.

30. A circuit interrupter arrangement, according to claim 29, further includes a first mechanical contact and a second mechanical contact being spaced apart one from the other a predetermined distance during the low-level pulse duration of the timing circuit.

31. A circuit interrupter arrangement, according to claim 30, wherein the first mechanical contact is movably responsive to operation of the circuit interrupting mechanism during the high-level duration of the current pulse from the timing circuit and the second mechanical contact is fixed with respect to operation of the circuit interrupting mechanism during the high-level duration of the current pulse from the timing circuit .

32. A circuit interrupter arrangement, according to claim 31, wherein the first mechanical contact is fixed to a solenoid plunger of the interrupting mechanism such that movement of the solenoid plunger during the high-level duration of the current pulse from the timing circuit causes movement of the first mechanical contact in the direction of the second mechanical contact.

33. A circuit interrupter arrangement, according to claim 32, wherein closing of the first and second mechanical contacts prior to completion of the high-level duration of the current pulse from the timing circuit produces a HIGH output signal from the solenoid feedback circuit causing the feedback controlled circuit to continue the electrical signal from the trip command circuit thereby completing the trip.

34. A circuit interrupter arrangement, according to claim 32, wherein failure to close the first and second mechanical contacts prior to completion of the high-level duration of the current pulse from the timing circuit produces a LOW output signal from the solenoid feedback circuit causing the feedback controlled circuit to discontinue the electrical signal from the trip command circuit thereby aborting the trip.

35. A circuit interrupter arrangement, according to claim 29, wherein the solenoid feedback circuit includes a circuit arranged and constructed for monitoring the rate at which current drawn from the power supply to actuate the circuit interrupting mechanism rises during the high-level duration of the current pulse from the timing circuit.

36. A circuit interrupter arrangement, according to claim 35, wherein the solenoid feedback circuit includes a resistor and a conventional operational amplifier circuit to determine if the monitored current has risen above a selected minimum threshold value and thereby generate a HIGH output signal to the feedback controlled circuit if the monitored current is above a minimum threshold value or LOW output signal if the monitored current is below the minimum threshold value.

37. A circuit interrupter arrangement, according to claim 29, wherein the solenoid feedback circuit includes a circuit arranged and constructed for monitoring electromagnetic flux developed in response to current drawn from the power supply to actuate the circuit interrupting mechanism during the high-level duration of the current pulse from the timing circuit.

38. A circuit interrupter arrangement, according to claim 37, wherein the solenoid feedback circuit includes a sense-winding coil wound around a solenoid plunger of the circuit interrupting mechanism for sensing the electromagnetic flux in the solenoid during the high-level pulse of the timing circuit.

39. A circuit interrupter arrangement, according to claim 38, wherein the solenoid feedback circuit further includes an operational amplifier, a resistor and a capacitor arranged to integrate the output of the sense-winding and generate a HIGH output signal to the feedback controlled circuit if the monitored electromagnetic flux is above a minimum threshold value or LOW output signal if the monitored electromagnetic flux is below the minimum threshold value.

40. A circuit interrupter arrangement, according to claim 29, wherein the solenoid feedback circuit includes a circuit arranged and constructed for monitoring a rate of change in electromagnetic flux in response to current drawn from the power supply to actuate the circuit interruption mechanism during the high-level duration of the current pulse from the timing circuit.

41. A circuit interrupter arrangement, according to claim 40, wherein the solenoid feedback circuit includes a sense-winding coil wound around a solenoid plunger of the circuit interrupting mechanism for sensing the changing electromagnetic flux in the solenoid, the output of the sense-winding being directly proportional to the voltage signal of the power supply immediately after initiation of the high-level pulse of the timing circuit.

42. A circuit interrupter arrangement, according to claim 41, wherein the solenoid feedback circuit further includes an operational amplifier and a pair of resistor for establishing an amplification factor, the solenoid feedback circuit being arranged to generate a HIGH output signal to the feedback controlled circuit if the monitored electromagnetic flux is above a minimum threshold value or LOW output signal if the monitored electromagnetic flux is below the minimum threshold value.

43. A circuit interrupter arrangement, according to claim 29, wherein the solenoid feedback circuit includes a circuit arranged and constructed for monitoring a signal proportional to a current flowing in the circuit path wherein the monitored signal is a negative signal from the current inducer circuit.

44. A circuit interrupter arrangement, according to claim 43, wherein the solenoid feedback circuit further includes a blocking diode, a resistor-capacitor network filter, voltage dividing resistors and a comparator for comparing the monitored signal with a reference voltage developed between the voltage dividing resistors.

45. A circuit interrupter arrangement, according to claim 44, wherein the comparator generates a HIGH output signal to the feedback controlled circuit when the monitored signal falls to a negligible level and LOW output signal when the monitored signal is higher than the reference voltage.

46. A circuit interrupter arrangement, according to claim 29, wherein a successful attempted trip of the circuit interrupter mechanism is detected by the solenoid feedback circuit during the high-level duration of the current pulse from the timing circuit and wherein the solenoid feedback circuit generates a HIGH output signal received by the feedback controlled circuit which continues the electrical signal from the trip command circuit during the low-level duration of the current pulse from the timing circuit thereby completing the trip.

47. A circuit interrupter arrangement, according to claim 29, wherein an unsuccessful attempted trip of the circuit interrupter mechanism is detected by the solenoid feedback circuit during the high-level duration of the current pulse from the timing circuit and wherein the solenoid feedback circuit generates a LOW output signal received by the feedback controlled circuit which discontinues the electrical signal from the trip command circuit during the low-level duration of the current pulse from the timing circuit thereby aborting the trip.

48. A circuit interrupter arrangement for interrupting current in a circuit path, wherein the current in the circuit path is controlled by a contactor control circuit operating a contactor coil for selectively closing and opening contacts electrically in series with the circuit path, the interrupter arrangement comprising:

a power supply circuit extracting operating power from the contactor control circuit operating the contactor coil and providing a voltage signal relative to common;

a fault detection circuit, responsive to a fault in the circuit path, for sending an electrical signal commanding that the circuit path be interrupted by using the voltage signal provided by the power supply circuit; and a trip mechanism constructed and arranged for interrupting the current in the circuit path in response to the electrical signal.

49. A circuit interrupter arrangement, according to claim 48, wherein the power supply circuit includes a pair of zener diodes arranged in series with the contactor coil.

50. A circuit interrupter arrangement, according to claim 49, wherein the zener diodes are arranged and constructed to avoid applying a voltage to the contactor coil with a DC offset.

51. A circuit interrupter arrangement, according to claim 48, wherein the power supply circuit includes a capacitor arranged to charge to a supply voltage via the current provided by the contactor control circuit.

52. A circuit interrupter arrangement, according to claim 48, further including an indicator operating from the power supply circuit and indicating the presents of power.

53. A circuit interrupter arrangement, according to claim 52, wherein the indicator includes a LED.

54. A circuit interrupter arrangement, according to claim 48, wherein the power supply includes a boost regulator.

* * * * *